United States Patent
Willis et al.

(10) Patent No.: US 8,433,588 B2
(45) Date of Patent: Apr. 30, 2013

(54) CUSTOMIZABLE INSURANCE SYSTEM

(75) Inventors: Dale Willis, Shaker Heights, OH (US);
David Rolnik, Beachwood, OH (US);
Glenn Renwick, Chagrin Falls, OH
(US); Daniel Michael, Parma, OH (US);
Raymond Ling, Westlake, OH (US);
Dan Gehrmann, Highland Heights, OH
(US); Faith Chiang, Cleveland, OH
(US); Patrick Callahan, Macedonia, OH
(US); Toby Alfred, Orange, OH (US)

(73) Assignee: Progressive Casualty Insurance Company, Mayfield Village, OH (US)

( * ) Notice: Subject to any disclaimer, the term of this patent is extended or adjusted under 35 U.S.C. 154(b) by 631 days.

(21) Appl. No.: 12/482,111

(22) Filed: Jun. 10, 2009

(65) Prior Publication Data
US 2010/0223078 A1    Sep. 2, 2010

Related U.S. Application Data

(60) Provisional application No. 61/060,240, filed on Jun. 10, 2008.

(51) Int. Cl.
*G06Q 44/00* (2011.01)
(52) U.S. Cl.
USPC ............... 705/4; 705/2; 705/26.3; 705/38
(58) Field of Classification Search .................. None
See application file for complete search history.

(56) References Cited

U.S. PATENT DOCUMENTS

| | | | | |
|---|---|---|---|---|
| 4,831,526 A * | 5/1989 | Luchs et al. | ...................... | 705/4 |
| 7,124,088 B2 * | 10/2006 | Bauer et al. | ...................... | 705/4 |
| 7,143,051 B1 * | 11/2006 | Hanby et al. | ...................... | 705/4 |
| 7,240,017 B2 * | 7/2007 | Labelle et al. | ...................... | 705/4 |
| 7,333,939 B1 * | 2/2008 | Stender et al. | ...................... | 705/4 |
| 7,343,309 B2 * | 3/2008 | Ogawa et al. | ...................... | 705/4 |
| 7,490,050 B2 * | 2/2009 | Grover et al. | ...................... | 705/4 |
| 7,499,875 B1 * | 3/2009 | May et al. | ...................... | 705/26.3 |
| 7,533,031 B1 * | 5/2009 | Silverbrook et al. | ............. | 705/4 |
| 7,542,914 B1 * | 6/2009 | Bates et al. | ...................... | 705/4 |
| 7,761,313 B1 * | 7/2010 | Brown et al. | ...................... | 705/4 |
| 7,877,269 B2 * | 1/2011 | Bauer et al. | ...................... | 705/2 |
| 7,925,523 B1 * | 4/2011 | McConnell et al. | ............. | 705/4 |

(Continued)

FOREIGN PATENT DOCUMENTS
WO      WO 91/20071      * 12/1991

OTHER PUBLICATIONS

Yen, Jerome, et al., "Collaborative and Scalable Financial Analysis With Multi-Agent Technology," Proceedings of the 32.sup.nd Hawaii International Conference on System Sciences. Mar. 1999.*

*Primary Examiner* — Robert Niquette
(74) *Attorney, Agent, or Firm* — Brinks Hofer Gilson & Lione

(57) ABSTRACT

An automated insurance quote system allows users to apply for one or more insurance quotes through a self-service communication channel. The system includes an interface that may receive applicant data from a remote location. A front-end processor selectively passes applicant data to a record keeping system retained in a memory. A controller or quote processors selects and transmits one or more insurance policies that are allowed under a user's governmental law and are tailored to the user's price and/or coverage preferences. The system conveys coverage details to users through the interface.

25 Claims, 30 Drawing Sheets

U.S. PATENT DOCUMENTS

| | | |
|---|---|---|
| 8,090,598 B2 | 1/2012 | Bauer et al. |
| 8,140,358 B1 | 3/2012 | Ling et al. |
| 2002/0188484 A1* | 12/2002 | Grover et al. .................... 705/4 |
| 2007/0136109 A1 | 6/2007 | Yager et al. |
| 2007/0226014 A1 | 9/2007 | Alemayehu et al. |
| 2010/0169209 A1* | 7/2010 | Kornegay et al. ............... 705/38 |

* cited by examiner

PROGRESSIVE | Call us anytime at 1-877-776-4266 / E-mail us

Name & Address   Vehicles   Drivers   Final Details   Your Rate

Choose the Package that's Best for You

Speak now with a licensed insurance representative
Talk to Me

You've created a custom package (6-month policy)   1402

$157.50

$174   Saved

○ 6 monthly payments   • paid in full (save $44)

> Basic $174.30   > Recommended $230.50   > Plus $73.50

1204

1206

Quote# 651750500

112 E. Hogan
Lombard, IL 60148

1 Vehicle   Add
2006 Ford Escort

1 Driver   Add
Bradey Smucker
> 0 violations

6-month Policy Coverages ($51.50/month or $285 paid in full)

| ? | Bodily Injury & Property Damage Liability | Edit | $100,000 per person $300,000 per accident $100,000 property damage | $125 |
| ? | Uninsured/Underinsured Motorist Bodily Injury | Edit | $100,000 per person $300,000 per accident | $18 |
| ? | Medical Payments | Edit | $5,000 per person | $15 |

2006 Ford Focus                                     Add custom parts

1208

| ? | Comprehensive Coverage | Edit | $500 deductible | $25 |
| ? | Collision Coverage | Edit | $500 deductible | $90 |
| ? | Uninsured Motorist Property Damage | Edit | No coverage | $0 |
| ? | Rental Car Reimbursement | Edit | $30 per day ($900 maximum) | $0 |
| ? | Roadside Assistance | Edit | No coverage | $0 |

Your Quote Summary
Pay in Full:   $285.00
Policy Term:   6 months

Continue to Buy

Discounts & Benefits

> Rate includes a one-time $50 discount for signing online
> View all $130 total discounts
> Learn about Progressive's customer benefits

Select a payment plan for your 6 month policy

6 Monthly Payments
$51.50 per month
Continue to Buy

5 future payments withdrawn from checking account ($309.00 time)

Pay in Full Today
$285.00 total
Continue to Buy

Total premium of $454.00 includes a $22 discount for paying in full

← Back   More payment plan options

Coverage can begin now or up to 60 days in the future

[VISA] [MC] [DISC] [eCHECK] [PayPal]

Quote is provided through Progressive Direct Insurance Co

Save & Return Later

Compare Auto Rates

In 3 minutes or less, get additional rates to compare to your Progressive Direct rate quote > Get Comparison Rates Compare   Other   Home
Auto Rates   Quotes   & Rental Copyright 1995-2008 Progressive Direct Insurance Company.
All Rights Reserved. Terms & Conditions / Privacy Policy / P2P Advisor Information is secure

PROGRESSIVE | Call us anytime at 1-877-776-4266 / E-mail us

Name & Address    Vehicles    Drivers    Final Details    Your Rate

Move the slider to choose your price
Or pick one of our personalized packages – designed just for you       1204

1204

| Basic $248 | Recommended $285 | Plus $302 |

1204

Move the slider $285

$1/4 ◄ ─────────────── ■ ─────────── ► $350

○ 6 monthly payments   ● paid in full (save $44)

Speak now with a licensed insurance representative

Talk to Me

Quote# 651758588

112 E. Hague
Lombard, IL 60148

1 Vehicle     [Add]
2006 Ford Escort

1 Driver      [Add]
Bradey Smucker
> 0 violations

6-month Policy Coverages  ($57.50/month or $285 paid in full)

| ? | Bodily Injury & Property Damage Liability | Edit | $100,000 per person $300,000 per accident $100,000 property damage | $125 |
| ? | Uninsured/Underinsured Motorist Bodily Injury | Edit | $100,000 per person $300,000 per accident | $18 |
| ? | Medical Payments | Edit | $5,000 per person | $18 |

2006 Ford Focus                                           ? Custom Parts

| ? | Comprehensive Coverage | Edit | $500 deductible | $26 |
| ? | Collision Coverage | Edit | $500 deductible | $96 |
| ? | Uninsured Motorist Property Damage | Edit | No coverage | $0 |
| ? | Rental Car Reimbursement | Edit | $30 per day ($900 maximum) | $0 |
| ? | Roadside Assistance | Edit | No coverage | $0 |

Your Quote Summary

Pay in Full:  $285.00
Policy Term:  6 months

Continue to Buy

Discounts & Benefits

> Rate includes a one-time $50 discount for signing online
> View all $130 total discounts
> Learn about Progressive's customer benefits Select a payment plan for your 6-month policy

6 Monthly Payments          Pay in Full Today

$57.50 per month      or      $285.00 total

Continue to Buy              Continue to Buy

5 future payments withdrawn from checking account ($310.00 total)     Total premium of $466.00 includes a $32 discount for paying in full < Back          More payment plan options Coverage can begin now or up to 60 days in the future

[MC] [VISA] [DISCOVER] [eCHECK] [PayPal]

Copyright 1995-2008 Progressive Casualty Insurance Company.
All Rights Reserved. Terms & Conditions / Privacy Policy / P3P Advisor
Save & Return Later Compare Auto Rates In 3 minutes or less, get additional rates to compare to your Progressive Direct rate quote > Get Comparison Rates Compare       Other        Home
Auto Rates    Quotes       & Rental (TRUSTe) Information is secure

PROGRESSIVE
1 INSURANCE WEB SITE - 2007

Call us anytime at 1-877-776-4266 / E-mail us

Name & Address    Vehicles    Drivers    Final Details    Rates

Speak now with a licensed insurance representative
Talk to Me

Drag the slider to compare prices
Or pick one of our personalized packages – designed just for you

1204

Basic $232    Recommended $632    Plus $753    Custom Package $632

1204

$232 ◀ ─────────── $632 ─────────── ▶ $753

○ 6 monthly payments    ● paid in full (6-month policy)

Quote #123456789

, OH

0 Vehicle(s)
2004 Honda Civic

1 Driver(s)

6-month Policy Coverage ($105.33/month, $632 paid in full)

| ? | Bodily Injury & Property Damage Liability | Edit | $100,000 per person<br>$300,000 per accident<br>$100,000 property | $268 |
| ? | Uninsured/Underinsured Motorist Bodily Injury | Edit | $100,000 per person<br>$300,000 per accident | $38 |
| ? | Medical Payments | Edit | $5,000 per person | $12 |

2004 Honda Civic

| ? | Comprehensive | Edit | $500 deductible | $63 |
| ? | Collision | Edit | $500 deductible | $218 |
| ? | Uninsured Motorist PD | Edit | No Coverage | $0 |
| ? | Rental Reimbursement | Edit | $30 per day (900 maximum) | $33 |
| ? | Roadside Assistance | Edit | No Coverage | $0 |

Your Quote Summary
Pay in Full: $632
Policy Term: 6 months

Continue to Buy

Compare Auto Rates

In 3 minutes or less, get additional rates to compare to your Progressive Direct rate quote.

Get Comparison Rates

Compare Auto Rates    Other Quotes    Home & Rental

6 Monthly Payments
$105.33 per month
Continue to Buy
5 future payments withdrawn from checking account ($310.00 total)

OR

Pay in Full Today
$632 total
Continue to Buy
Total premium of $285.00 includes a $32.00 discount for paying in full

| Business Rule | HO | Age | Income | HW | Health Insurance | Lease | Output Format | Basic (Min) 97 BI | PD | UM/UIM | Medpay | Recomended (Choice) 98 BI | PD | UM/UIM | Medpay | Plus 99 BI | PD | UM/UIM | Medpay | Max 100 BI | PD | UM/UIM | Medpay |
|---|---|---|---|---|---|---|---|---|---|---|---|---|---|---|---|---|---|---|---|---|---|---|---|
| 1 | Y | <35 | any | any | N | N | Text LCL Directpro Labels | 20K/40K | 15K | 20K/40K | none | 100K/300K | 100K | 100K/300K | $5K | 250K/500K | 100K | 250K/500K | $5K | 500CSL | 500CSL | 500CSL ST | 10K |
| 2 | N | <35 | any | any | N | N | Text LCL Directpro Labels | 20K/40K | 15K | 20K/40K | none | 50K/100K | 50K | 50K/100K | $5K | 100K/300K | 100K | 100K/300K | $5K | 500CSL | 500CSL | 500CSL ST | 10K |
| 3 | Y | >=35 | any | <250K | N | N | Text LCL Directpro Labels | 20K/40K | 15K | 20K/40K | none | 100K/300K | 100K | 100K/300K | $5K | 250K/500K | 100K | 250K/500K | $5K | 500CSL | 500CSL | 500CSL ST | 10K |
| 4 | Y | >=35 | >=100K | >=250K | N | N | Text LCL Directpro Labels | 20K/40K | 15K | 20K/40K | none | 250K/500K | 100K | 250K/500K | $5K | 500K CSL | 500K CSL | 500K CSL | $5K | 500CSL | 500CSL | 500CSL ST | 10K |
| 5 | Y | >=35 | <100K | >=250K | N | N | Text LCL Directpro Labels | 20K/40K | 15K | 20K/40K | none | 100K/300K | 100K | 100K/300K | $5K | 250K/500K | 100K | 250K/500K | $5K | 500CSL | 500CSL | 500CSL ST | 10K |
| 6 | N | >=35 | >50K | any | N | N | Text LCL Directpro Labels | 20K/40K | 15K | 20K/40K | none | 100K/300K | 100K | 100K/300K | $2K | 100K/300K | 100K | 100K/300K | $2K | 500CSL | 500CSL | 500CSL ST | 10K |
| 7 | N | >=35 | <=50K | any | N | N | Text LCL Directpro Labels | 20K/40K | 15K | 20K/40K | none | 50K/100K | 50K | 50K/100K | $5K | 100K/300K | 100K | 100K/300K | $5K | 500CSL | 500CSL | 500CSL ST | 10K |
| 8 | any | any | any | <250K | N | Y | Text LCL Directpro Labels | 20K/40K | 15K | 20K/40K | none | 100K/300K | 100K | 100K/300K | $5K | 250K/500K | 100K | 250K/500K | $5K | 500CSL | 500CSL | 500CSL ST | 10K |
| 9 | any | any | any | >=250K | N | Y | Text LCL Directpro Labels | 20K/40K | 15K | 20K/40K | none | 250K/500K | 100K | 250K/500K | $5K | 500K CSL | 500K CSL | 500K CSL | $5K | 500CSL | 500CSL | 500CSL ST | 10K |
| 10 | Y | <35 | any | any | Y | N | Text LCL Directpro Labels | 20K/40K | 15K | 20K/40K | none | 100K/300K | 100K | 100K/300K | $2K | 100K/300K | 100K | 100K/300K | $2K | 500CSL | 500CSL | 500CSL ST | 10K |
| 11 | N | <35 | any | any | Y | N | Text LCL Directpro Labels | 20K/40K | 15K | 20K/40K | none | 50K/100K | 50K | 50K/100K | $2K | 100K/300K | 100K | 100K/300K | $2K | 500CSL | 500CSL | 500CSL ST | 10K |
| 12 | Y | >=35 | any | <250K | Y | N | Text LCL Directpro Labels | 20K/40K | 15K | 20K/40K | none | 100K/300K | 100K | 100K/300K | $2K | 100K/300K | 100K | 100K/300K | $2K | 500CSL | 500CSL | 500CSL ST | 10K |
| 13 | Y | >=35 | >=100K | >=250K | Y | N | Text LCL Directpro Labels | 20K/40K | 15K | 20K/40K | none | 250K/500K | 100K | 250K/500K | $2K | 500K CSL | 500K CSL | 500K CSL | $2K | 500CSL | 500CSL | 500CSL ST | 10K |
| 14 | Y | >=35 | <100K | >=250K | Y | N | Text LCL Directpro Labels | 20K/40K | 15K | 20K/40K | none | 100K/300K | 100K | 100K/300K | $2K | 250K/500K | 100K | 250K/500K | $2K | 500CSL | 500CSL | 500CSL ST | 10K |

Figure 22

| Business Rule | Vehicle Ownership | Vehicle Age | PNI Age | Collision Indicator Y/N | Output Format | Basic (Min) 97 | | | | | | | Recommended (Choice) 98 | | | | | | | Plus 99 | | | | | | | Max 100 | | | | | | |
|---|---|---|---|---|---|---|---|---|---|---|---|---|---|---|---|---|---|---|---|---|---|---|---|---|---|---|---|---|---|---|---|---|---|
| | | | | | | Coll | Comp | UMPD | Rental | Roadside | Payoff | Coll | Comp | UMPD | Rental | Roadside | Payoff | Coll | Comp | UMPD | Rental | Roadside | Payoff | Coll | Comp | UMPD | Rental | Roadside | Payoff |
| 1 | Lien | 0-4 | <21 | any | Text / LCL / Directpro Labels | none | none | none | none | none | none | 500 Ded | 500 Ded | none | $30/day | none | selected | 500 Ded | 500 Ded | none | none | none | selected | 50 Ded | 50 Ded | none | $50/day | selected | selected |
| 2 | Lien | 0-4 | >=21 | any | Text / LCL / Directpro Labels | none | none | none | none | none | none | 500 Ded | 500 Ded | none | $30/day | none | selected | 500 Ded | 500 Ded | none | $40/day | none | selected | 50 Ded | 50 Ded | none | $50/day | selected | selected |
| 3 | Lien | 5 | <21 | any | Text / LCL / Directpro Labels | none | none | none | none | none | none | 500 Ded | 500 Ded | none | none | selected | selected | 500 Ded | 500 Ded | none | none | selected | selected | 50 Ded | 50 Ded | none | $50/day | selected | selected |
| 4 | Lien | 5 | >=21 | any | Text / LCL / Directpro Labels | none | none | none | none | none | none | 500 Ded | 500 Ded | none | $30/day | selected | selected | 500 Ded | 500 Ded | none | $40/day | selected | none | 50 Ded | 50 Ded | none | $50/day | selected | selected |
| 5 | Lien | >=6 | <21 | any | Text / LCL / Directpro Labels | none | none | none | none | none | none | 500 Ded | 500 Ded | none | none | selected | none | 500 Ded | 500 Ded | none | none | selected | none | 50 Ded | 50 Ded | none | $50/day | selected | selected |
| 6 | Lien | >=6 | >=21 | any | Text / LCL / Directpro Labels | none | none | none | none | none | none | 500 Ded | 500 Ded | none | $30/day | selected | none | 500 Ded | 500 Ded | none | $40/day | selected | none | 50 Ded | 50 Ded | none | $50/day | selected | selected |
| 7 | Lease | 0-4 | <21 | any | Text / LCL / Directpro Labels | none | none | none | none | none | none | 500 Ded | 500 Ded | none | none | none | none | 500 Ded | 500 Ded | none | none | none | none | 50 Ded | 50 Ded | none | $50/day | selected | selected |
| 8 | Lease | 0-4 | >=21 | any | Text / LCL / Directpro Labels | none | none | none | none | none | none | 500 Ded | 500 Ded | none | $30/day | none | none | 500 Ded | 500 Ded | none | $40/day | none | none | 50 Ded | 50 Ded | none | $50/day | selected | selected |
| 9 | Lease | >4 | <21 | any | Text / LCL / Directpro Labels | none | none | none | none | none | none | 500 Ded | 500 Ded | none | none | selected | none | 500 Ded | 500 Ded | none | none | selected | none | 50 Ded | 50 Ded | none | $50/day | selected | selected |
| 10 | Lease | >4 | >=21 | any | Text / LCL / Directpro Labels | none | none | none | none | none | none | 500 Ded | 500 Ded | none | $30/day | selected | none | 500 Ded | 500 Ded | none | $40/day | selected | none | 50 Ded | 50 Ded | none | $50/day | selected | selected |
| 11 | Own | any | any | N | Text / LCL / Directpro Labels | none | none | none | none | none | none | none | none | $25K w/ $250 ded | none | none | none | none | none | $50K w/ $250 ded | none | none | none | none | none | $100K w/ $250 ded | none | selected | none |
| 12 | Own | 0-4 | <21 | Y | Text / LCL / Directpro Labels | none | none | none | none | none | none | 500 Ded | 500 Ded | none | none | none | none | 500 Ded | 500 Ded | none | none | none | none | 50 Ded | 50 Ded | none | $50/day | selected | none |
| 13 | Own | 0-4 | >=21 | Y | Text / LCL / Directpro Labels | none | none | none | none | none | none | 500 Ded | 500 Ded | none | $30/day | none | none | 500 Ded | 500 Ded | none | $40/day | none | none | 50 Ded | 50 Ded | none | $50/day | selected | none |
| 14 | Own | >4 | <21 | Y | Text / LCL / Directpro Labels | none | none | none | none | none | none | 500 Ded | 500 Ded | none | none | selected | none | 500 Ded | 500 Ded | none | none | selected | none | 50 Ded | 50 Ded | none | $50/day | selected | none |

Figure 23

| Business Rule | Vehicle Ownership | Vehicle Age | Pri Age | Collision Indicator | Priority Output Format | Package 1 49 | | | | | | | Package 2 42 | | | | | | | Package 3 25 | | | | | | | Package 4 39 | | | | | |
|---|---|---|---|---|---|---|---|---|---|---|---|---|---|---|---|---|---|---|---|---|---|---|---|---|---|---|---|---|---|---|---|---|
| | | | | | | Coll | Comp | UMPD | Rental | Roadside | Payoff | | Coll | Comp | UMPD | Rental | Roadside | Payoff | | Coll | Comp | UMPD | Rental | Roadside | Payoff | | Coll | Comp | UMPD | Rental | Roadside | Payoff |
| 1 | Lien | 0-4 | <21 | any | Text LCL DirectproLabels | none | none | none | none | none | none | | none | none | none | none | none | none | | none | none | none | none | none | none | | none | none | none | none | none | none |
| 2 | Lien | 0-4 | >=21 | any | Text LCL DirectproLabels | none | none | none | none | none | none | | none | none | none | none | none | none | | none | none | none | none | none | none | | none | none | none | none | none | none |
| 3 | Lien | 5 | <21 | any | Text LCL DirectproLabels | none | none | none | none | none | none | | none | none | none | none | none | none | | none | none | none | none | none | none | | none | none | none | none | none | none |
| 4 | Lien | 5 | >=21 | any | Text LCL DirectproLabels | none | none | none | none | none | none | | none | none | none | none | none | none | | none | none | none | none | none | none | | none | none | none | none | none | none |
| 5 | Lien | >=6 | <21 | any | Text LCL DirectproLabels | none | none | none | none | none | none | | none | none | none | none | none | none | | none | none | none | none | none | none | | none | none | none | none | none | none |
| 6 | Lien | >=6 | >=21 | any | Text LCL DirectproLabels | none | none | none | none | none | none | | none | none | none | none | none | none | | none | none | none | none | none | none | | none | none | none | none | none | none |
| 7 | Lease | 0-4 | <21 | any | Text LCL DirectproLabels | none | none | none | none | none | none | | none | none | none | none | none | none | | none | none | none | none | none | none | | none | none | none | none | none | none |
| 8 | Lease | 0-4 | >=21 | any | Text LCL DirectproLabels | none | none | none | none | none | none | | none | none | none | none | none | none | | none | none | none | none | none | none | | none | none | none | none | none | none |
| 9 | Lease | >4 | <21 | any | Text LCL DirectproLabels | none | none | none | none | none | none | | none | none | none | none | none | none | | none | none | none | none | none | none | | none | none | none | none | none | none |
| 10 | Lease | >4 | >=21 | any | Text LCL DirectproLabels | none | none | none | none | none | none | | none | none | none | none | none | none | | none | none | none | none | none | none | | none | none | none | none | none | none |
| 11 | Own | any | any | N | Text LCL DirectproLabels | none | none | none | none | none | none | | none | none | none | none | none | none | | none | none | none | none | none | none | | none | none | none | none | none | none |
| 12 | Own | 0-4 | <21 | Y | Text LCL DirectproLabels | none | none | none | none | none | none | | none | none | none | none | none | none | | none | none | none | none | none | none | | none | none | none | none | none | none |
| 13 | Own | 0-4 | >=21 | Y | Text LCL DirectproLabels | none | none | none | none | none | none | | none | none | none | none | none | none | | none | none | none | none | none | none | | none | none | none | none | none | none |

Figure 24

| Package # | Priority | BIPD | COMP | COLL | RENTAL | ROADSIDE | Price |
|---|---|---|---|---|---|---|---|
| 1 | 49 | $20/$40 | no cov | no cov | No Rental Cov | Roadside No | $ 112 |
| 2 | 42 | $50/$100 | no cov | no cov | No Rental Cov | Roadside No | $ 135 |
| 3 | 25 | $100,000/$300,000 | no cov | no cov | No Rental Cov | Roadside No | $ 159 |
| 4 | 39 | $250/$500+ | no cov | no cov | No Rental Cov | Roadside No | $ 170 |
| 5 | 28 | $100,000/$300,000 | $100 COMP DED | no cov | No Rental Cov | Roadside No | $ 215 |
| 6 | 30 | $20/$40 | $1000 COMP DED+ | $1000 COLL DED+ | No Rental Cov | Roadside No | $ 264 |
| 7 | 32 | $50/$100 | $1000 COMP DED+ | $1000 COLL DED+ | No Rental Cov | Roadside No | $ 275 |
| 8 | 44 | $100,000/$300,000 | $1000 COMP DED+ | $1000 COLL DED+ | No Rental Cov | Roadside No | $ 285 |
| 9 | 45 | $20/$40 | $500 COMP DED | $500 COLL DED | No Rental Cov | Roadside No | $ 298 |
| 10 | 29 | $20/$40 | $500 COMP DED | $500 COLL DED | No Rental Cov | ROADSIDE Yes | $ 305 |
| 11 | 38 | $50/$100 | $500 COMP DED | $500 COLL DED | No Rental Cov | Roadside No | $ 310 |
| 12 | 34 | $20/$40 | $500 COMP DED | $500 COLL DED | Yes Rental Cov | Roadside No | $ 315 |
| 13 | 40 | $50/$100 | $500 COMP DED | $500 COLL DED | No Rental Cov | ROADSIDE Yes | $ 317 |
| 14 | 33 | $100,000/$300,000 | $500 COMP DED | $500 COLL DED | No Rental Cov | Roadside No | $ 320 |
| 15 | 37 | $20/$40 | $500 COMP DED | $500 COLL DED | Yes Rental Cov | ROADSIDE Yes | $ 322 |
| 16 | 41 | $100,000/$300,000 | $500 COMP DED | $500 COLL DED | No Rental Cov | ROADSIDE Yes | $ 327 |
| 17 | 36 | $50/$100 | $500 COMP DED | $500 COLL DED | Yes Rental Cov | Roadside No | $ 327 |
| 18 | 26 | $50/$100 | $500 COMP DED | $500 COLL DED | Yes Rental Cov | ROADSIDE Yes | $ 334 |
| 19 | 31 | $100,000/$300,000 | $500 COMP DED | $500 COLL DED | Yes Rental Cov | Roadside No | $ 337 |
| 20 | 27 | $50/$100 | $250 COMP DED- | $500 COLL DED | Yes Rental Cov | ROADSIDE Yes | $ 342 |
| 21 | 43 | $100,000/$300,000 | $500 COMP DED | $500 COLL DED | Yes Rental Cov | ROADSIDE Yes | $ 344 |
| 22 | 48 | $100,000/$300,000 | $250 COMP DED- | $500 COLL DED | Yes Rental Cov | ROADSIDE Yes | $ 354 |
| 23 | 50 | $250/$500+ | $500 COMP DED | $500 COLL DED | Yes Rental Cov | ROADSIDE Yes | $ 354 |
| 24 | 46 | $50/$100 | $250 COMP DED- | 250 COLL DED- | Yes Rental Cov | ROADSIDE Yes | $ 355 |
| 25 | 47 | $100,000/$300,000 | $250 COMP DED- | 250 COLL DED- | Yes Rental Cov | ROADSIDE Yes | $ 369 |
| 26 | 35 | $250/$500+ | $250 COMP DED- | 250 COLL DED- | Yes Rental Cov | ROADSIDE Yes | $ 385 |

Figure 25

CUSTOMIZABLE INSURANCE SYSTEM

PRIORITY CLAIM

This application claims the benefit of priority from U.S. Provisional Application No. 61/060,240, filed Jun. 10, 2008, which is incorporated by reference.

BACKGROUND OF THE INVENTION

1. Technical Field

This application relates to insurance, and more particularly to customizing an insurance quote online.

2. Related Art

Insurance companies insure against risk in return for a premium. The companies may offer a limited number of policies that bind them to indemnify against specific losses. Many companies offer different types of coverage at different prices. These coverages are actuarially priced and these rates are typically filed with the Department of Insurance in a given state.

While some minimum insurance coverage amount may be required by state regulations, many users must choose from quotes that also include various coverages in various limits or amounts. These users, when utilizing a self-service channel, may find it difficult to build or modify the coverages to suit their individual needs.

SUMMARY

An automated insurance quote system allows users to request one or more insurance quotes through a self-service and/or agent-service communication channel. The system includes an interface that may receive applicant data from a remote location. A front-end processor selectively passes applicant data to a record keeping system retained in a memory. A controller or a quote processor selects and transmits one or more insurance quotes that are allowed under a user's government law or regulations and are tailored to the user's price and/or coverage preferences. The system conveys coverage details to users through the interface.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the inventions.

FIGS. 4-20 are exemplary screens that may be generated by an automated insurance quote system.

FIG. 21-22 are exemplary tables of liability business rules that may be accessed by the automated insurance quote system.

FIGS. 23-24 are exemplary tables of vehicle business rules that may be accessed by the automated insurance quote system.

FIG. 25 is an exemplary table correlating coverages to both liability and vehicle business rules.

DETAILED DESCRIPTION OF THE PREFERRED EMBODIMENTS

An automated insurance quote system streamlines an insurance process by coordinating activities associated with providing insurance. The system enhances the collection of information by gathering information directly from a user (e.g., a prospective or existing customer, agent, etc.) in real-time, near real-time, or after a delay at a physical or a virtual site. The system may leverage data by offering quotes, insurance policies, and/or protection plans that are allowed or approved under the law and are tailored to user data or to a user's needs or preferences. The system may allow a user to select or enter details of vehicles and drivers and in some alternative systems, the effective dates of an insurance policy and/or a renewal term through an interface such as an object-orientated interface (e.g., an interface in which elements are represented by screen entities).

Some systems comprise a local area and/or wide area network that splits processing of an application between a front-end client and a back-end server or server cluster that may be part of a client server architecture. The client may comprise a local or remote computer or controller that may execute specific computer applications to send data over a network or pull content from a Web site. A customized client-server protocol may be used to communicate between a privately accessible network and a publicly accessible network. The server or host server may comprise a single computer or a group of independent network servers that operate, and appear to local or remote clients, as if they were a single unit although they may be spread across a distributed network. The server may comprise hardware that may communicate with back-end processors that execute program(s) that provide time sharing and data management between local or remote clients, provides multi-user functionality, supports persistent and/or non-persistent connections with local or remote clients, and/or may provide or stand behind various firewalls and other security features. The logic and programming may be distributed among multiple memories that preserves data for retrieval and may provide access or support other devices, some of which may work independently but also may communicate with other remote or local devices that have similar or different operating systems.

The automated insurance quote system may format data so that it provides useful content that may be used or supplemented while reducing the amount of data entry required to process prospective or existing insurance policies through a self-servicing channel, an agent-servicing channel, and/or directly by insurance company representatives who may use the system to make, receive, and/or adjust an application or an existing agreement for insurance on behalf of the consumer.

Figure 29:
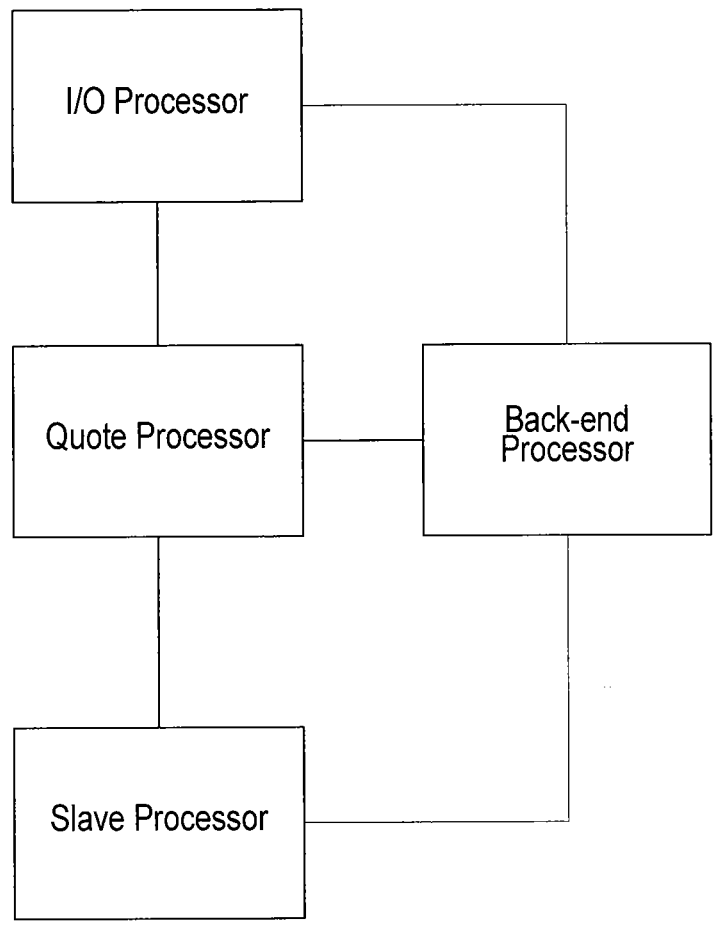
FIG. 29 is an exemplary alternative architecture of an automated insurance quote system.

Some systems include back-end processors that execute software that quantifies data. Insurance or other data may be quantified (e.g., in some cases, coverage priorities may be translated into numerical values or priority indicia that may be based on a numerical point scale) to valuate policy preferences. A quote processor (FIG. 29) may perform specialized tasks such as selecting between competing coverage based on the translated priorities (e.g., such as those described by exemplary business rules). The quote processors may communicate with slave processors (e.g., a processor may be considered a 'slave' because the processor is subordinate to the quote processor and/or back-end processor, freeing the quote and back-end processors for other work) that perform the specialized task providing rapid access to a local and/or distributed database that retain quote details and/or recommendations. An offer of insurance to an applicant (and their acceptance) or an adjustment to an existing policy may occur automatically in real-time, near real-time, or after some delay. Some systems allow a representative (or third party), such as insurance representatives, to validate applicant qualifications (e.g., error checking), facilitate insurance processing, and/or facilitate acceptance and/or changes. An application sharing controller or system may interface the server or client to provide a representative access to a shared document, an application, or views of a user's screen in real-time. The representative may facilitate an insurance quote or the execution of an insurance policy from a remote destination through a remote computer that has access to a publicly accessible distributed network.

The automated insurance quote system may be coupled to multiple remote or local clients supporting web browsers and/or graphical user interfaces in some systems. Information may be encrypted, use digital signatures, or may be processed or supplemented with other security measures to protect the integrity of the information. Remote clients may be coupled to the system through a matrix of networks, gateways, bridges, routers, and/or other intermediary devices that handle data transfer and/or data conversions from a sending network protocol to a similar or different receiving network protocol. Intraware, groupware, or other software executed by a processor may translate the data received from the clients, remote computers, or a remote automated online insurance quote system into the data that is received and stored on a host server through a publicly accessible distributed network like the Internet or a privately accessible network like an Intranet. The data may include text, graphics, images, multimedia, and/or other information that may be stored at substantially the same rate as the data is received, after some delay, or at a near real time rate in memory resident to or coupled to the host server. The data may be received through communication with distributed or central commercial or governmental servers (e.g., state department of insurance or state commissioner of insurance servers). The commercial or governmental servers may serve specific or unique data about an applicant. Alternative data may define or describes the laws, rules, bulletins, rates, form filings, etc. that affects coverage or insurance policies (e.g., required rates, terms, coverage types, etc.). The data may be processed by a server, server cluster, processor, or client of the automated insurance quote system to ensure that insurance applications, quotes, and/or policy offerings are in compliance with local, state, and/or other regulations (e.g., governmental laws or rules).

Figure 1:
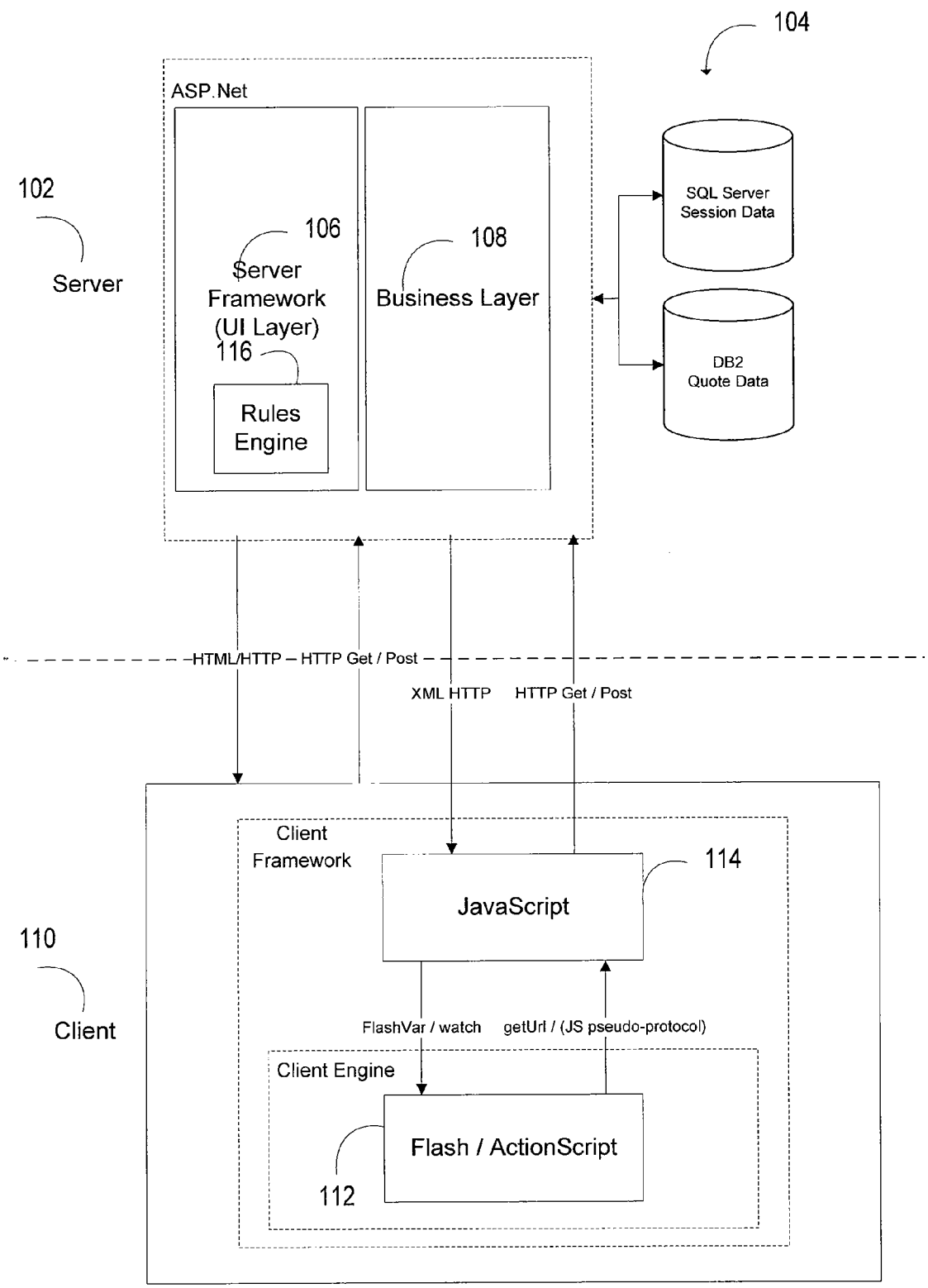
FIG. 1 is an exemplary architecture of an automated insurance quote system.
Figure 2:
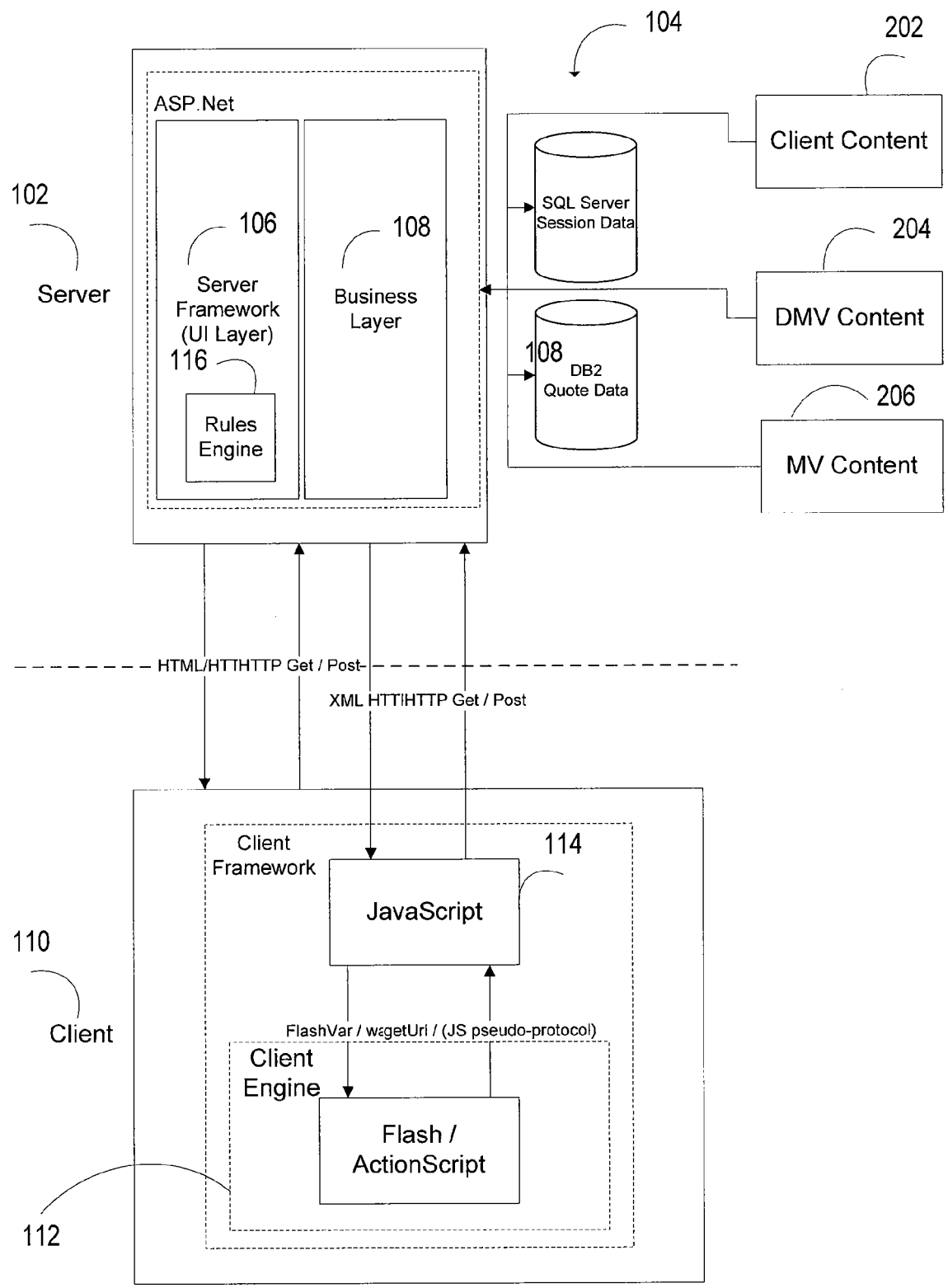
FIG. 2 is an exemplary alternative architecture of an automated insurance quote system.

The automated online insurance quote system shown in FIG. 1 includes a server cluster 102 linked to a data warehouse 104 (e.g., one or more databases that may distributed and accessible to many computers and may retain information from one or many sources in a common or variety of formats), and in some alternative systems, linked to external content servers and legacy systems (FIG. 2). The server clusters 102 provide functionalities that allow users to obtain insurance through a self-service (or agent-service) communication channel. The server cluster 102 may support a thin client (or thin server) architecture 106. Extensible business rules 116 and a business layer 108 may customize the features and software that may be transferred to a remote client computer 110. The server cluster 102 may process or serve the tasks associated with applying, qualifying, and/or securing insurance. In some automated insurance quote systems, the server cluster 102 executes software that automates an insurance transaction and renders the dynamic, fixed, and/or variable content that may be delivered directly to an applicant or indirectly through an intermediary, such as an insurance agent, through a stateless controller or interface. In some alternative systems, an applicant may seek insurance through a call center, an agent, (that may access the automated insurance quote system through an application sharing controller that interfaces the system) and/or a Web based application. The content may be accessed through a push (used to send data) and/or a pull technology (used to request data).

Figure 26:
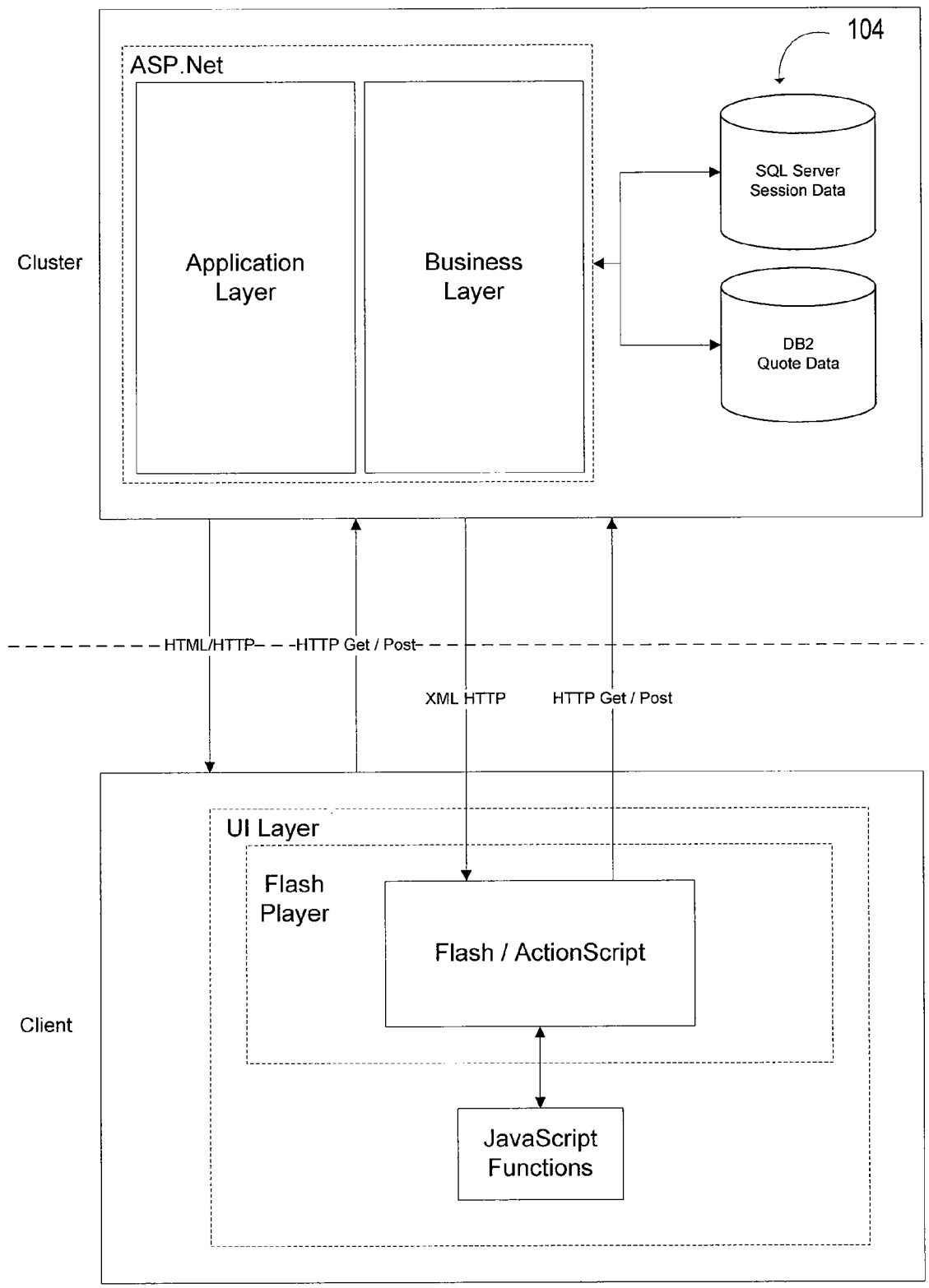
FIG. 26 is an exemplary alternative architecture of an automated insurance quote system.
Figure 27:
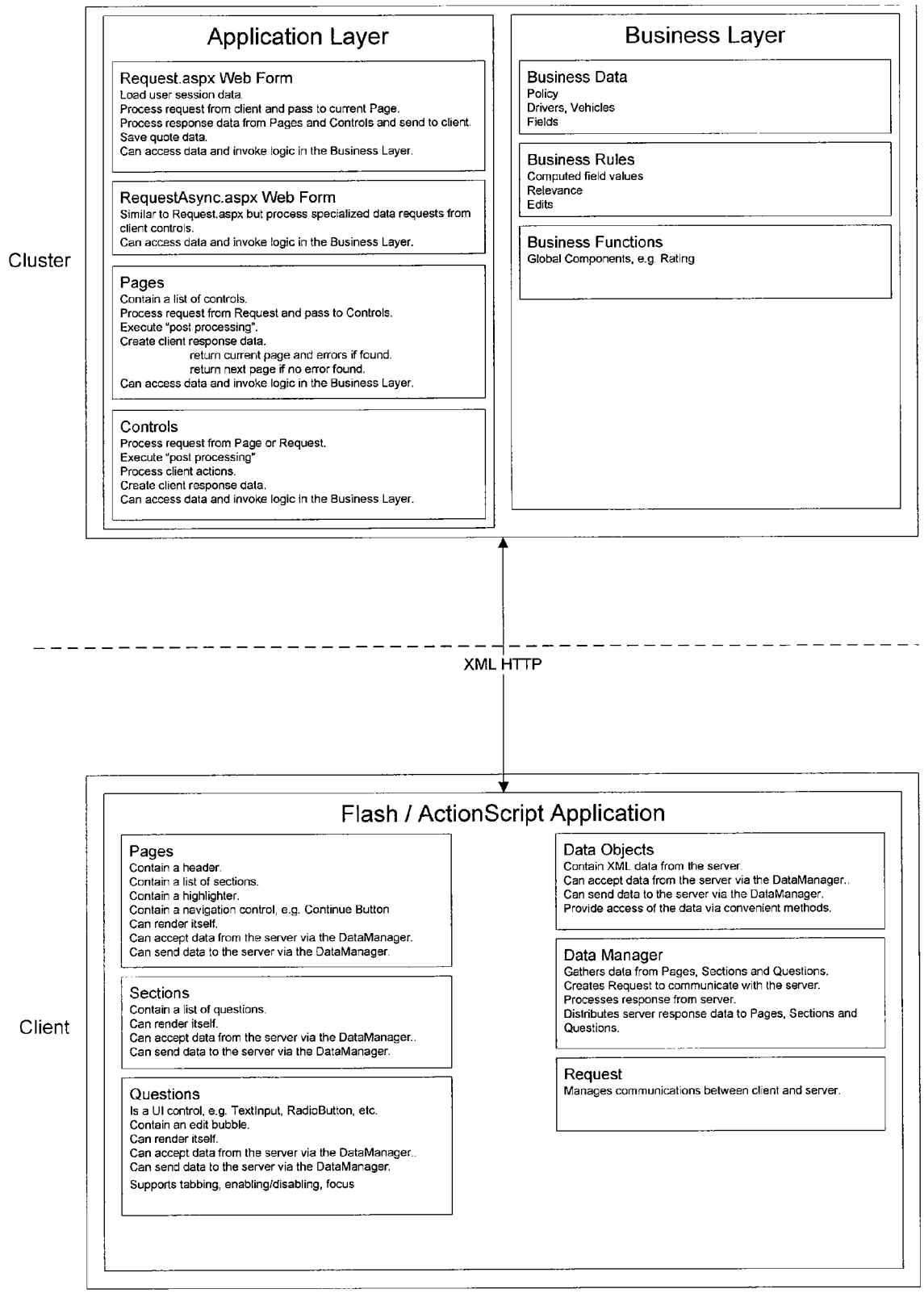
FIG. 27 is an exemplary protocol layer of the exemplary alternative architecture of FIG. 26.
Figure 28:
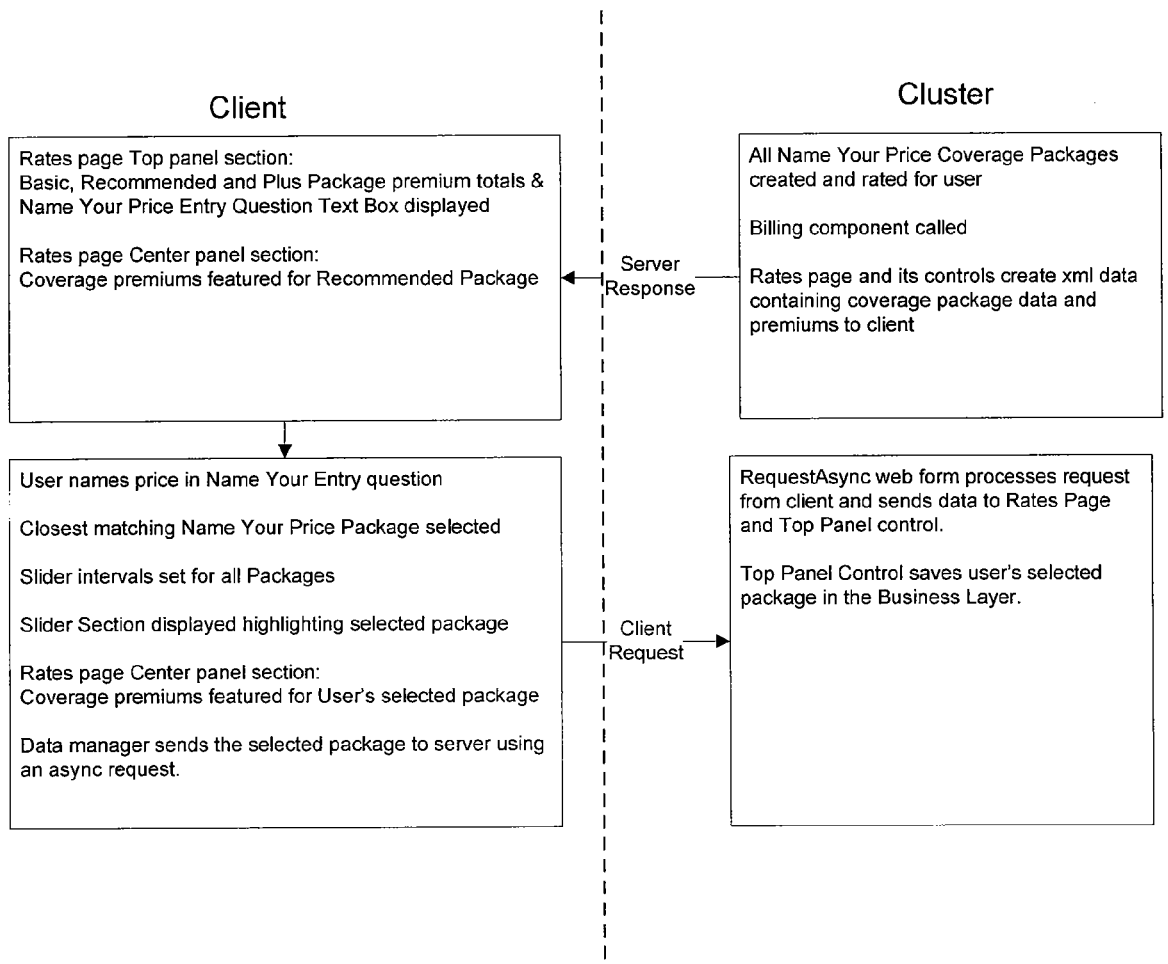
FIG. 28 is an exemplary exchange between a client and cluster.

The details of a session or transaction may be stored in one or more files that comprise records. The records may contain fields, together with a set of operations that facilitate searching, sorting, recombining, and other functions. In FIGS. 1, 2, and 26, the data warehouse 104 may comprise one or more databases (e.g., Structured Query Language databases or SQL DBs, databases that comprise one or more flat files, such as 2-dimensional arrays, etc.) that retain the information needed to qualify, validate, offer, recommend, revise, and/or execute insurance quotes. While the data warehouse 104 may be distributed across remote locations, accessed by several computers, and may contain information from multiple sources in a variety of formats, some data warehouses 104 are directly accessible to or resident to the server cluster 102 or a slave processor. For longer term storage or data analysis, data may be retained in archival database(s). Some systems include a backup that allows the data warehouse 104 to be restored to a transaction level when enabled. The system may restore the data warehouse 104 automatically when a software or hardware error has rendered some or the entire data warehouse 104 unusable. When a more serious error occurs, the backup data warehouse may automatically step in and assume the processes and functionality served by the data warehouse 104 when the server cluster 102 or a monitoring system identifies software or hardware errors that have rendered a portion of the database, or the entire database, unusable. In some circumstances, that original data warehouse or a replacement may serve as a storage back-up when the errors are corrected.

The databases of FIGS. 1, 2 and 26 may comprise hierarchical databases that retain searchable indices within the database that reference distinct portions of the database and/or data locations within ancillary storage devices or remote databases. The databases and storage devices may be accessible through a slave-processor, file server and/or a database management server. Data warehouse access may be transparent to the user, who may use commands to retrieve and receive all or selected information. The data warehouse may contain data about how the warehouse 104 is organized, where the information may be found, and how the data may be related. In FIGS. 1 and 2, the data warehouse 104 may retain session data and quote data.

The server cluster 102 in FIG. 2 may also communicate with legacy system(s) and/or backend system(s) 202-206 that may reside behind firewall(s) that protect the server clusters 102 and the data warehouse 104. Compatibility with the legacy system(s) and/or backend system(s) (e.g., client content 202, Department of Motor Vehicle content "DMV" 204, Motor Vehicle content "MV" 206, etc.) may be managed by the server cluster 102 or by separate interfaces (e.g., remote), integrated, or programmed within the legacy system(s) and/or backend system(s) 202-206.

In some automated online insurance quote systems, the server cluster 102 may serve content through a Rich Internet Application (e.g., RIA). The RIA may run locally in a secure environment on a remote computer or client 110. A client engine 112 or flash player may be activated when RIAs are received by the server cluster 102. The client engine 112 may act as an extension of the browser, render the user interface, and may support synchronous and asynchronous communication (e.g., pre-fetching content) with the server cluster 102. In some RIA applications, insurance coverage characteristics may be downloaded to the client 110 before content is requested by the user. These applications may not require distinct download requests to render content across one or more pages and may allow the system to download one or many (e.g., 2, 5, 35, or more) insurance coverages that may comprise one or more common or unique (e.g., customized to an applicant or client) insurance line items.

In some systems, the client engine 112 is run within a sandbox. The sandbox may comprise a closely-controlled remote environment that may have limited access to client resources. A Javascript 114 may interface the client engine 112 to provide some access to local and/or remote resources. In alternative applications, the client engine 112 may rely on a certificate approach (e.g., ActiveX controls) that is not limited by sandbox restrictions. A certificate approach may be used by Java and Javascript programs and controllers.

In an alternative system, content may be delivered through markup language Web applications. The pages served by the server clusters 102 (and/or Web clusters in some alternative systems) may include links that allow users to select vehicles, customize line coverages, coverage limits, terms, and/or customize other characteristics associated with a prospective or an existing insurance policy. When a hyperlink associated with one or more particular insurance products or other choices is selected (e.g., a user may click on the link), the user may automatically receive content from the server clusters 102 (may occur through the Web clusters). Hyperlinks associated with the selection may include user or recipient information embedded by an input/output processor in a predetermined format that may be transmitted to a destination. In one implementation, the information may include unique identifiers which identify or encode the recipient's identity and an identifier of an insurance product or data associated with an insurance request. When content is transmitted through electronic messages, the hyperlink may identify or encode the identity of the recipient, and the selection of which may identify the identity of the recipient to the server clusters 102. In some alternative implementations, the selection of the hyperlink connects the user to content within the server cluster 102 and may validate the user. The selection may automate a login process or automate access to secure or private information customized to the user. In another implementation the server cluster 102 may store blocks of data on a client system that may retain session keys. When a user accesses (or returns) to the server cluster 102, the remote computer or client 110 may transmit a copy of the data to the server cluster 102. The data may be used to identify users, instruct the server cluster 102 to send a customized version of a requested page, to submit account information for the user, and/or for other administrative or technical purposes.

Figure 3:
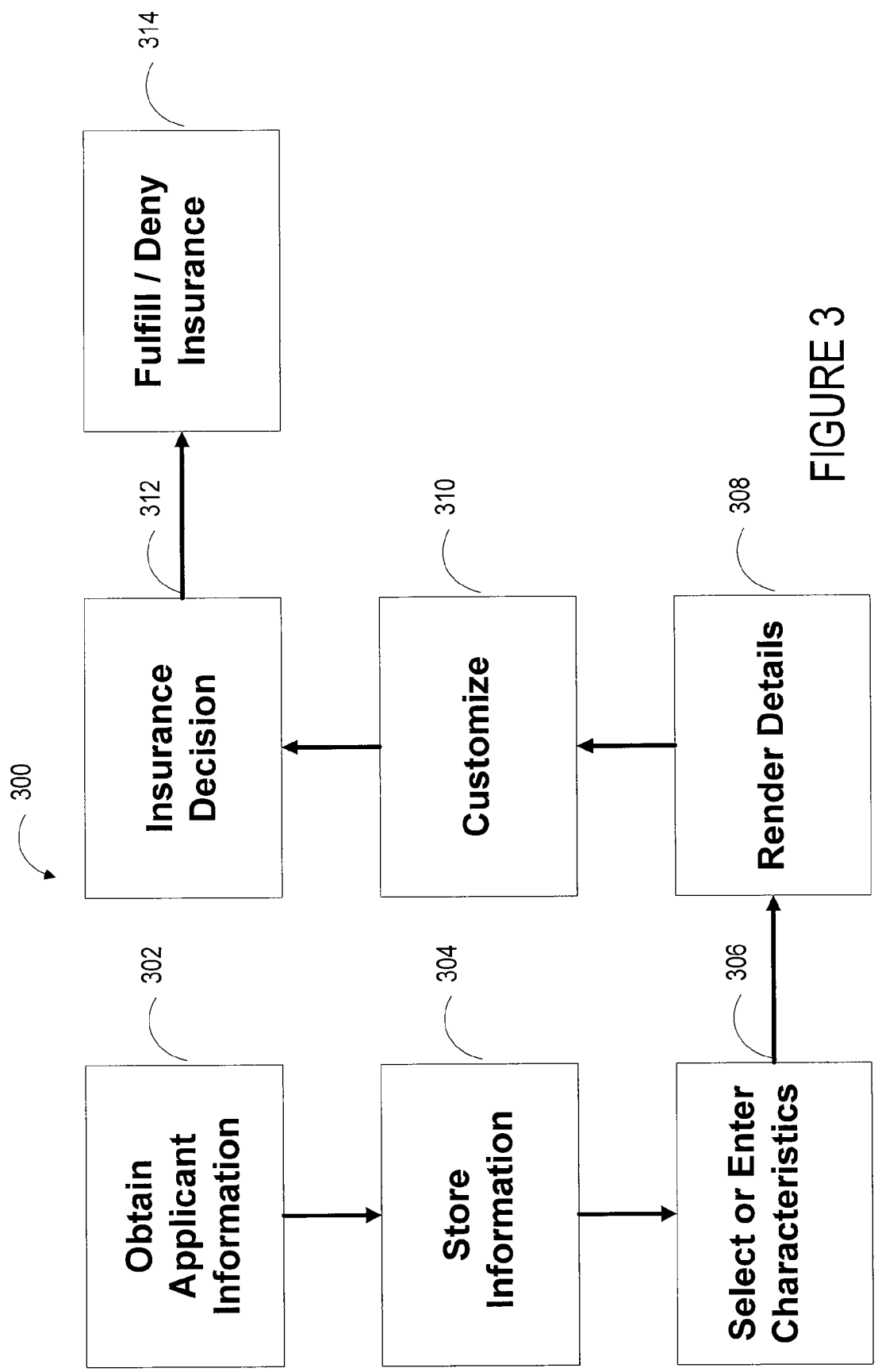
FIG. 3 is an exemplary flow diagram that processes insurance policies.
Figure 4:
Figure 6:
Figure 7:
Figure 8:
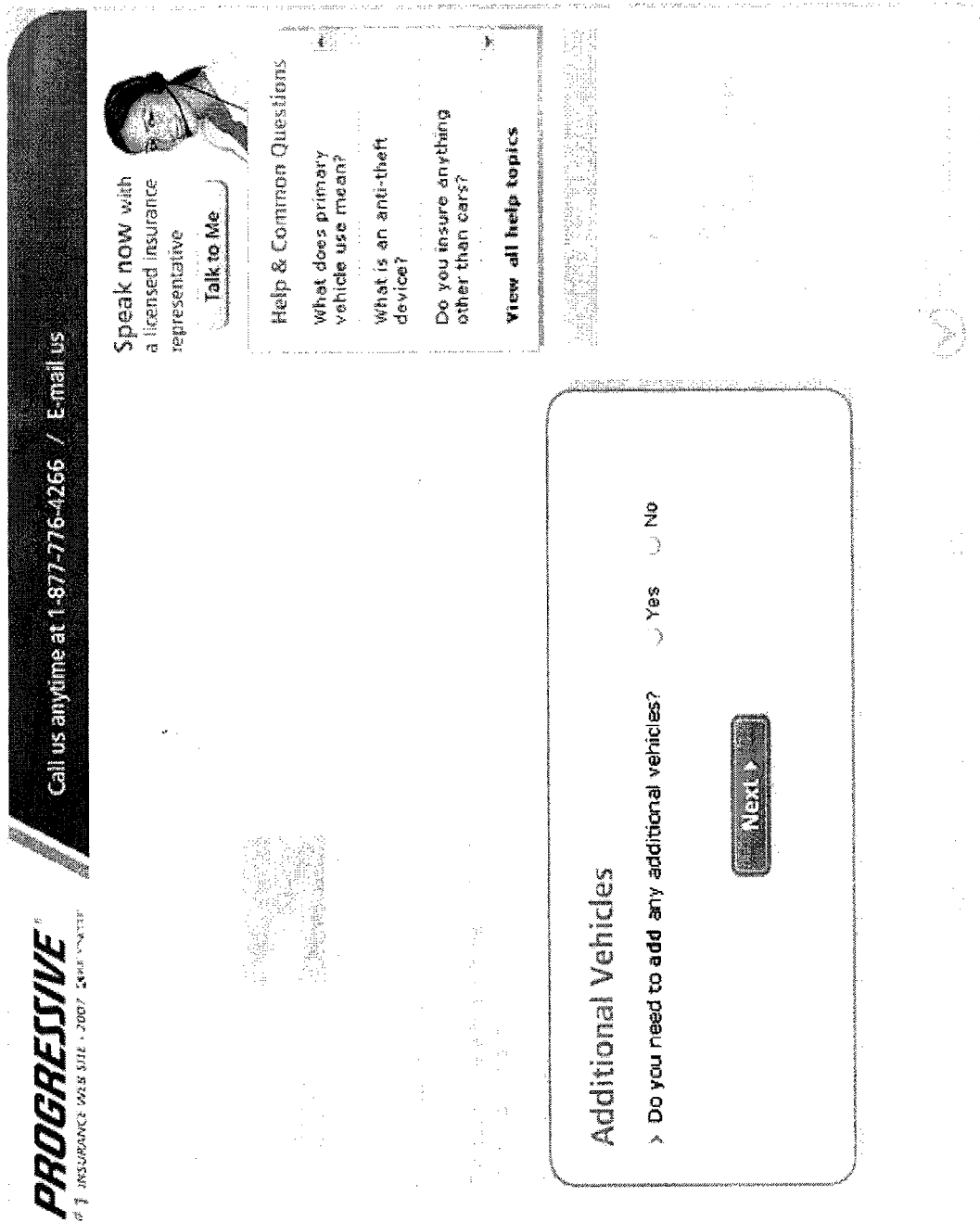
Figure 9:
Figure 10:
Figure 11:

An exemplary online insurance process shown in FIG. 3 allows a user to apply for insurance through a remote interface. The user may enter applicant (e.g., policyholder, personal, etc.) information at 302. Some processes may require an authentication or may require the review or acknowledgement of one or more agreements or disclaimers before a user may activate and select the icons, menus, and/or dialog boxes that may comprise a user interface used to receive data. The data may be stored in a local memory or at a remote location at 304. In some processes the data is retained in records, each of which contains fields associated with a set of operations for searching, sorting, recombining, and/or other functions, such as a database or other record keeping systems. In some processes, the record keeping systems are not directly accessible to applicants to maintain data integrity and/or security.

When selected information is entered (or selected), such as the user's name, address, and vehicles, a user may be prompted to enter or select additional vehicles or the names of additional drivers. A front-end process may collect or receive additional details about applicant(s) or vehicle(s). The details may relate to primary vehicle use (e.g., personal, pleasure, business, farming), a zip code of where a vehicle is kept, whether the vehicle is owned or leased (e.g., own and make payments, owned and do not make payments, lease), marital status (e.g., single, married, widowed, divorced), primary residence (e.g., own house/condominium/mobile home, other), current U.S. license status (e.g., valid, permit, suspended, permanently revoked), social security number, whether an applicant recently moved within a period (e.g., sixty days), was involved in an accident, cited for violations, or filed any insurance claims within a period (e.g., sixty days, thirty six months, etc.), insurance history, email address, and/or other information.

When the data is entered and stored in a remote or a local database (e.g., through one or more slave processors, for example), one or more characteristics of an insurance quote may be selected or entered at 306. In some processes, line coverages and/or desired pricing may be entered (or selected) by an applicant or end user through a rate delivery page. The user may enter (or select) a desired price and indicate that the price represents an installment (e.g., a monthly price) or a paid-in-full price through a dialog box or an online form, such as a text entry box.

Several coverages may be offered (e.g., through a quote processor that performs the specialized task of selecting insurance coverage based on programmed business rules and user selections and/or preference data, for example), displayed, and selected through one or more option-selection areas that may be rendered (e.g., through an input/output processor) on a page that may have a fixed form but variable content. One or more interactive-toggle buttons may display two or more groups of coverage options that may have different line coverages. In some processes, the interactive-toggle buttons may act like radio station selectors within a vehicle. The selection of one button may deselect or change displayed insurance coverages or packages, so that the cost of one package may be displayed within an option selection display area. The line coverages that may be automatically rendered in a line coverage area of a page (through a quote processor) may reflect the protection available or offered at or near the user's price and preferences. When line coverages change, an input/output processor may transmit the time-sensitive commands that cause line coverage appearance to change or highlighted those changes when rendered on a display. The input/output processor handles the input and output operations of the process to relieve the burden on the other processor or server. In some applications, the highlighting or change may dissolve or fade when acknowledged by a user or when a programmed time expires. In some processes, the sequence of line-coverages (e.g., bodily injury & property damage liability, uninsured/underinsured motorist bodily injury, medical payments, collision, rental car, roadside assistance, etc.) listed in the line-coverage area may be arranged in a pre-determined order. The sequence may be pre-programmed based on an alphabetical order, a random order, or through criteria that in some implementations may reflect applicants' aversion to risk and/or expected preferences.

An on screen help feature in the form of a help window or a cartoon-like dialog balloon may appear when a user positions a cursor over an icon or element or makes an incorrect selection or data entry. The help feature may be rendered through a front-end processor that processes data that explain the elements or objects on the rate delivery page or associated or linked document(s). In some systems, the front-end processor is located between (and communicates with) the input communication lines received from one or more users and a second processor or server that controls the automated insurance quote system. The front-end processor may render a help feature that suggests that a user enter or select a desired price that the applicant is willing to pay for insurance. By entering a price, the user causes the client (e.g., remote computer) or quote processor to identify coverages that suit their needs and desired preferences that are sanctioned (or allowed under state, regional law, or governmental laws) within their domicile or a designated area (e.g. a user designated area).

The entry of a price or a selection of an insurance coverage may yield details of offered insurance coverages, at a price and term at 308. The details may be shown through the text descriptions in the line coverage area and a horizontal (or vertical) scroll bar rendered by the input/output processor that handles the output of the data within an option selection display area of the rate delivery page. The horizontal scroll bar or slider in the option selection display area may be moved through keyboard selections and/or a relative and/or absolute pointing device selection. A selection allows users to scroll through different coverages and price points. The scroll bar may have four active areas: two scroll arrows for moving incrementally between the closest coverage prices at an increasing or decreasing premium, a sliding scroll box for moving to an arbitrary coverage or price point between an upper and lower premium limit (that may be designated near adjacent ends of the arrows), and (in some processes/systems) an intermediate or central area for scrolling through quotes in increments. Content movement through more coverage and higher costs quotes may occur when a user selects a portion of the scroll bar between an upper premium limit and the sliding scroll box, while movement through lower coverage and lower costs quotes may occur when a user selects a portion of the scroll bar between a lower premium limit and the sliding scroll box.

When coverages are selected through interactive toggle button(s), submissions of prices, and/or through scroll bar movement, the line coverages of the quote may be rendered in the line coverage area of the page. As the coverages change, the line coverage appearances may be highlighted or altered (as described). Line coverages may be further customized to a user's needs or preferences through menu programs, such as an on-screen edit features that may be adjacent to a line coverage entry at 310. After activating this feature by clicking, selecting, actuating, or hovering a cursor over an icon (e.g., an edit button) or item, a dialog balloon, pop-up menu, or drop-down menu may appear. The menu may be context-sensitive by highlighting available options (e.g., unavailable option may not be rendered or may be dimmed on screen in comparison to one or more valid menu choices) that may depend on the context in which the option is called. A change in coverage, such as an increase or decrease in a collision deductible or increase in liability coverage, for example, may be selected through a keyboard entry or pointing device (e.g., through an absolute and/or relative pointing device). Some menus and balloons may provide information, advice, and pricing for a desired change. The price may represent differences between a selection and the present cost of the quoted policy. In some processes, the menus may provide the user with an easy-to-use alternative to memorizing coverage categories and desired costs and coverages.

In an alternative process, each or selected line coverages included in a coverage package may be modified through horizontal scroll bars that may be moved through keyboard and/or relative or absolute pointing device selections. A selection allows users to scroll through different line coverages and price points that may comply with the user's local and/or governmental regulations. The scroll bar may have four active areas: two scroll arrows for moving incrementally between the closest line-item prices at an increasing or decreasing adjustment, a sliding scroll box for moving to an arbitrary coverage or price point between an upper and lower line-item limits (that may be designated near adjacent ends of the arrows), and (in some processes/systems) an intermediate area for scrolling through line-item coverages and costs in increments. Content movement through more coverage and higher priced coverages may occur when a user selects a portion of the scroll bar between an upper price limit and the sliding scroll box, while movement through lower coverage and lower prices may occur when a user selects a portion of the scroll bar between a lower price limit and the sliding scroll box.

Some alternative processes provide a lock-in feature. The lock-in feature allows users to lock-in one or more line coverages or price points. In these processes, a lock-in coverage or price point holds that coverage and/or price point established by a user and prevents the coverage levels or prices from being deleted or changed. In some systems the lock-in feature may be rendered through the input/output processor that generates an interactive control that may comprise one or more objects such as check boxes, radio buttons, control objects, etc. The objects may be enabled or disabled by user selections. When enabled coverage levels and/or price points may not be deleted or moved. In some processes, locking in a line coverage or price level does not affect a user's control or adjustment of other line coverage and price points that are not locked.

In some processes, one or more of the option selection area, option selection display area, and line coverage area may be anchored to an interface that may provide access to an insurance representative (e.g., that may access the automated insurance quote system through an application sharing controller) and summaries of user details, quote identifiers, and quotes that may be rendered through a graphical interface. The anchored objects may move (or remained positioned) relative to these areas of the page or may remain stationary to keep these objects in view or at a certain position in a page or document.

When an insurance selection occurs, the client or process conveys the user' selections through an interface, such as a graphical user interface or a command interface, to a destination, such as an input/output processor, server cluster or a remote controller that may include or communicate with a front-end processor, a back-end-processor, an optional slave processor, and a quote processor that may serve an insurance company or an insurer's Web site. In some processes, communication with the destination may occur through synchronous schedules or asynchronous events. The timing may be based on user selection, access times, events (e.g., certain data entries or user selections), available communication bandwidths, or through other criteria.

A record of some or all of the transaction activities that occur through the process are stored in a server side or client side log. In some processes, an audit trail traces all of the activities affecting some or each piece of data or information, such as a data record, from the time it is entered into (selected within) the process to the time it is transmitted or removed. In these processes, the audit trail may make it possible to document, for example, what changes were, when a change occurred, and when the document was transmitted to a destination (e.g., the hardware that serves an online insurance site).

After concluding the customization process, the user (e.g., the insurer in this context) may post a decision on an online site or transmit the decision to the client through a secure link at 312. The decisions may include an acceptance and approval, coverage details, terms, insurer stipulations, a request for information, an offer of an alternative insurance plan, and/or a decline. Some decisions may be embedded by an input/output processor within a uniform resource locator that specifies an address, a protocol, and the name of a server that a decision and information relating to the decision may be found. This may allow users to transmit decisions without being concerned about someone else receiving their confidential data. The process may minimize inadvertent disclosures to unauthorized users. Some decisions may be initiated through static emails or facsimiles, or other forms of communication some of which may also include hyperlinks embedded with additional information that is unique to an insurance applicant and/or a landing page.

When insurance decisions are made, the content is further processed. The data may be stored as a database record in a memory remote from or local to the destination or the insurer's site. In some processes, the database(s) or record keeping system is part of a local hub-and-spoke architecture that provides local access to insurance decisions to more than one user (e.g., may include one or more insurance agents, third parties, etc.).

If accepted, the process may coordinate or facilitate data validation for the user and/or insurance data. When completed, the process may electronically coordinate, electronically generate, and/or transmit or convey documents needed to validate, execute, close, or deny the insurance at 314. The documents may include an insurance application or agreement, an invoice, and/or a confirmation of payment (e.g., an electronic payment). Some electronic payments may occur through fund transfers, debit cards, credit cards, and payment processing systems for online vendors. If immediate proof of insurance is needed, proof of insurance documents may be sent directly to a user-designated destination, such as a vehicle dealer, finance department, or other entity.

Figure 30:
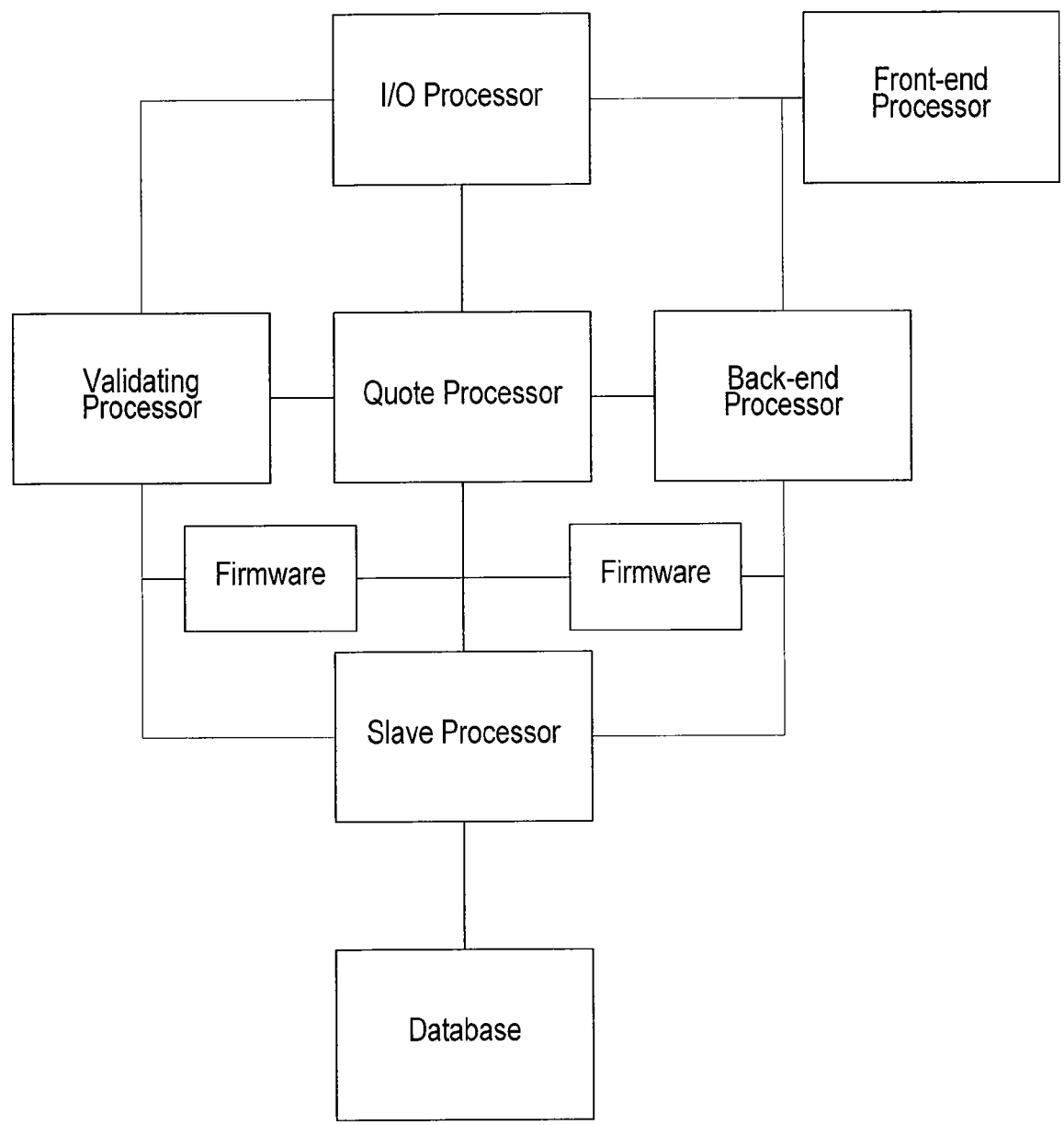
FIG. 30 is an exemplary alternative architecture of an automated insurance quote system.

In another alternative system, the methods and descriptions of FIGS. 3-22 (to be described), may be programmed in one or more embedded systems (e.g., comprising a special-purpose computer that performs dedicated functions), controllers, microcontrollers, servers, processors (e.g., an input/output processor, an optional validating processor (FIG. 30), a quote processor, a web-based processor, etc.). The processors may comprise one or more central processing units that supervise the sequence of micro-operations that execute the instruction code and data coming from memory (e.g., accessible through databases or slave processor that accesses the database) that generate, support, and/or complete a transaction such as an insurance transaction or process insurance data. The dedicated applications may support and define the functions of the special purpose processor or processors that are customized by instruction code. In some systems, the front-end processor may perform the complementary tasks of gathering or receiving data for another processor or program to work with, and for making the data and results available to other embedded systems, controllers, microcontrollers, processors, servers, or other computer processes. An optional validating processor may execute instruction code and process data retained in a database (or communicate with a slave-processor that may provide the specialized task of providing rapid access to a database) or memory that ensures that the insurance offerings comply with the applicable laws and regulations that may govern an applicant. A quote processor may assess the risk of enrolling an applicant in a policy through the rules or business rules of the system and provide one or more insurance coverage offerings that comply with laws or regulations, the applicant's preferences and/or the results or output of the optional validating processor. Some quote processors may process an applicants or insured's request for changes, which may include changes in coverage types, payment plans, and/or agreement terms. Web based processors may serve the documents, displays, and functions that render the one or more pages that may be accessed by one or more Web sites.

In yet other alternative systems, some parts or all of processes of FIGS. 3-22 are rendered through a firmware component that is implemented as a permanent memory module such as ROM or distributed between firmware and RAM, for example. The firmware may be programmed and tested like software, and may be distributed with one or more of the processors or hardware described or in alternative systems accessed by other processors and controllers that are specifically programmed to perform any (e.g., some) or all of the functions described above. Firmware may be implemented to coordinate operations of the processor or controller or other hardware and contains programming constructs used to perform such operations. In yet other alternative systems, the methods and descriptions of FIGS. 3-22 may comprise logic stored in a memory that may be accessible through an interface and is executable by one or more processors to perform specialized tasks. Some signal-bearing storage medium or computer-readable medium comprise a memory that is unitary or separate from a device, programmed within a device, such as one or more integrated circuits, or retained in memory and/or processed by a controller or a computer. If the pages are rendered or methods are performed by software, the software or logic may reside in a memory resident to or interfaced to one or more processors or controllers that restrict the devices to specialized tasks and may also support a tangible or visual communication interface, wireless communication interface, or a wireless system. The memory may include an ordered listing of executable instructions for implementing logical functions. A logical function may be implemented through digital circuitry or through analog circuitry in alternative systems. Software may be stored in a memory such as a read only memory (e.g., firmware) resident to system that may maintain a persistent or non-persistent connection with two or more automated insurance quote systems or an intermediary that may convey insurance policy applications to one or more destinations (e.g., processors, controllers, or clusters that supports an insurance destinations). Such a system may include a computer-based system, a processor-containing system, or another system that includes an input and output interface that may communicate with a publicly accessible distributed network through a wireless or tangible communication bus through a public and/or proprietary protocol and may be subordinate to a main processor.

An applicant, or insured, or representative, such as insurance agent or user, may enter information into the automated online insurance quote system or process in many ways. An applicant may call and convey the information by telephone to an agent or a representative, convey information in person in an agent's or representative's office, or enter the information through a remote computer online or off-line allowing the information to be received by the automated insurance system in real time or after some delay. Whether information is collected off-line, online, or through a representative, the information may be entered through an interface. Some interfaces may be generated by a client-side script (e.g., JavaScript) and/or flash application that renders an entry screen that may look like FIG. 4.

Figure 5:
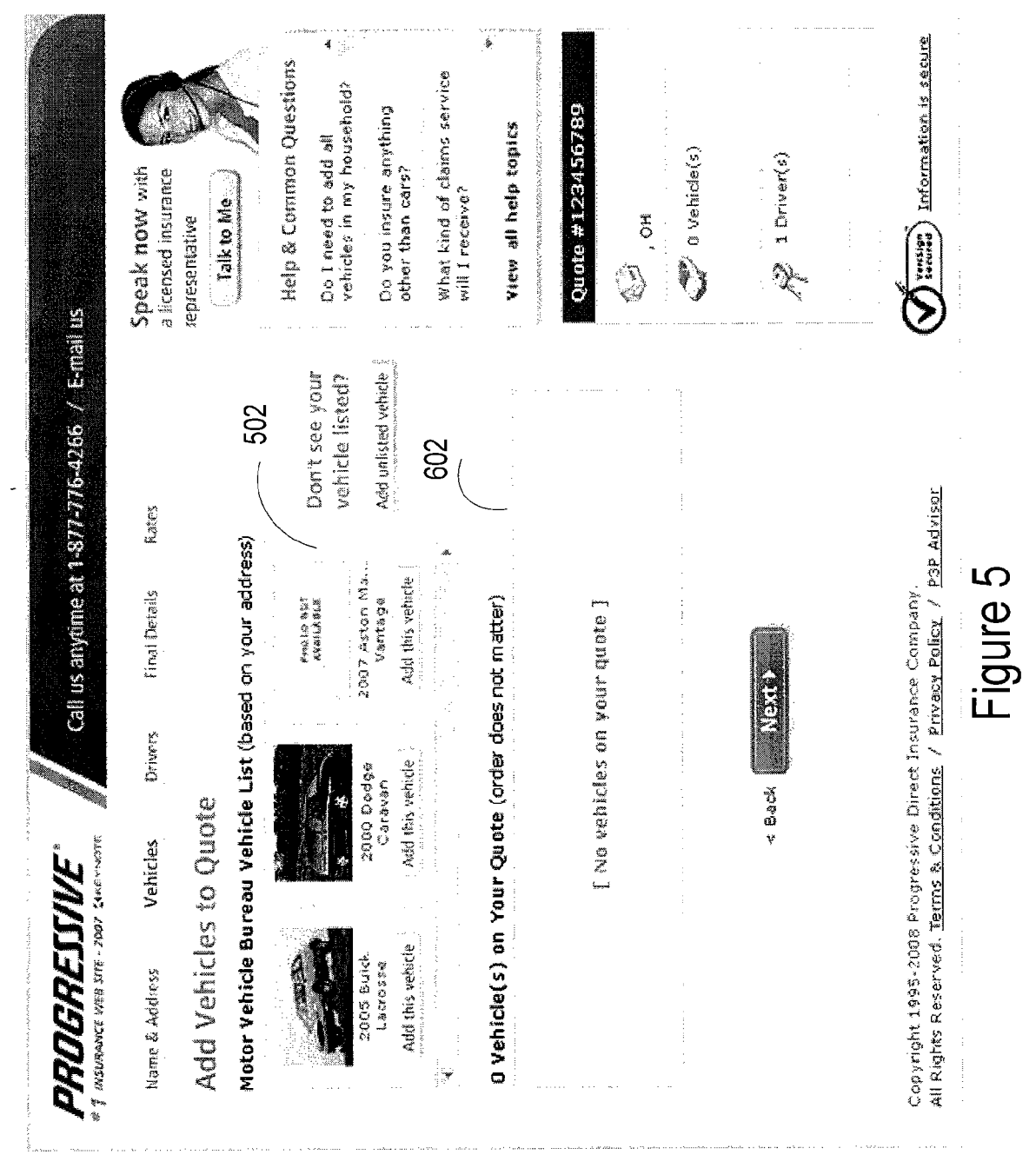

When personal information is entered (e.g., name, address, date of birth) a program, process(es), server, front-end processor, or server cluster (hereinafter referred to as a device) may gather information automatically by harvesting third party data provider's records from remote servers or clusters in real time. In FIG. 5, a visual control, such as a selection bar 502, is populated with images of vehicles being quoted, which are retrieved through one or more databases of motor vehicles records and images that may be served by a slave processor or a remote or local server or cluster. When a user selects or clicks on a vehicle image, the selected vehicle image moves to the quote bar 602 (FIG. 6) before a user is prompted by a hyperlink to advance to the next page. Objects that provide access to representative help features and summaries may be tagged to other objects or anchored to positions on one or more pages to keep these objects in view or at certain positions on pages or documents.

Additional applicant details may be sought to correctly underwrite an applicant. Client-side scripts (e.g., JavaScript) and/or flash applications may render other entry screens that may look like FIGS. 7-11. The details sought through these screens may include details about vehicle use (e.g., personal, pleasure, business, farming), where the vehicle is kept (zip code), whether the vehicle is owned or leased (e.g., own and make payments, owned and do not make payments, lease), marital status (e.g., single, married, widowed, divorced), primary residence (e.g., own house/condominium/mobile home, other), U.S. license status (e.g., valid, permit, suspended, permanently revoked), social security number, whether an applicant recently moved (e.g., in the last sixty days, other periods), was involved in an accident, cited for violations, or filed any insurance claims within a period (e.g., sixty days, thirty six months, etc.), insurance history, email address, and/or other information. The information may be gathered through menu programs, dialog boxes, radio buttons, and other features that may receive information through a graphical user interface, or gathered from third party resources harvested through servers or front-end processors.

After the quote information is captured and stored on the client or a server cluster, a rate delivery page may be rendered through a script (e.g., a client side JavaScript), flash application, or other medium. When a user selects or clicks on interactive-toggle buttons 1204 (e.g., shown as >Basic $21.30 mo >Plus $73.50 mo in FIG. 12) different insurance coverage packages may be displayed. The displayed packages may reflect coverages required by law, lending companies, finance companies, loan sources (e.g., applicant's, a typical loan source, or another criteria), popularity, etc. that may be harvested from remote servers or other sources. The selection or toggling of a button (e.g., >Basic $21.30 mo) deselects or changes recommended insurance coverages or packages, so that the cost of an alternative coverage package is displayed within the option selection display area 1206. The line coverages shown in the line coverage area 1208 of a page may change automatically to reflect the protection offered at that selection. When line coverages change in FIGS. 12-20, their appearance may be highlighted to call attention to that change. The highlighting may dissolve or fade when a programmed time expires. In FIGS. 12-20, the sequence of line coverages may be positioned in a determined order. The sequence may be based on an alphabetical order, a random order, grouped by policy level and vehicle level coverages, or through preprogrammed criteria or through a quote processor that may reflect or process the user's quote information to detect an applicants' aversion to risk and/or expected preferences that may be established by business rules (e.g., FIG. 25). In alternative systems an applicant's aversion to risk may be measured through a questionnaire or by visual horizontal and/or vertical scroll-bars. The scroll-bars may be rendered through an input/output processor and enabled through a user's absolute and/or relative pointing device. In these systems the distal and proximal ends of the scroll bars may represent a risk averse or risk seeking behavior, respectively. An intermediate position may represent risk neutral behavior. Through two or more active areas (e.g., four active areas): objects or arrows positioned at the ends of the bars for moving in predetermined increments, a sliding scroll box for moving to an arbitrary location on the display interface, and the travel areas (e.g., intermediate linear areas) between the objects or arrows of the scroll bar for moving in larger or smaller predetermined increments, the system may measure risk tolerance. By a positional movement of the scroll box, a user may establish his or her risk tolerance. Based on their input and demographic data gathered by or available to the system, the quote processor or a recommendation engine may recommend a policy, line coverage (e.g., line items), policy term, cost, or other variable parameter(s) associated with the user's profile and/or risk tolerance. While many algorithms may be used to make recommendations, some systems make recommendations based on pre-established associations between user's demographics (e.g., user's profile) and the number of line coverage and/or policies purchased by similar users having the same or similar risk tolerances. Recommendations may change as more user's make selections and may be created when a users demographics or user profile and risk aversion do not match those retained by the automated insurance quote system's recommendation database. When recommendations are created, some automated insurance quote systems may not provide these new recommendations until a predetermined number of similar user selections are detected. These recommendations may be retained by a local or remote distributed recommendation database that associates coverage and/or policies with user profiles. Other factors that are alternatively or additionally processed by the quote processor, may include for example, an insurer's, state, or regulator's recommended coverage.

Figure 13:

The on screen help feature 1302 like the one shown in FIG. 13 may comprise a cartoon-like dialog balloon that may appear when a user positions a cursor over an icon or element or makes an incorrect selection or data entry. The help feature may explain the elements or objects on the rate delivery page or associated or linked document(s). For example, in FIG. 13, the help feature may suggest that a user enter or select a desired price that the applicant is willing to pay for insurance. By entering a price, the user causes the client (e.g., remote computer) to identify one or more coverages that suit their needs and desired preferences and that is sanctioned or allowed under state or regional law and/or a third party that retains an encumbrance (e.g., a lien or a claim). In alternative systems, the coverages may reflect coverages recommended or required by an applicant's loan or finance company or other entities that have an ownership or compliance interests.

The entry of a price or a selection of an insurance coverage (and in some alternative systems, a desired or customized term) may yield details of offered insurance coverages, at a price and term. The details may be shown through the text descriptions in the line coverage area 1208 and a conversion of a price entry object into a horizontal scroll bar 1402 within the option selection display 1206 in FIGS. 14 and 15. Additional interactive-toggle buttons that browse recommendations may be rendered with check boxes, drop down menus, radio buttons, or other interactive controls that allow users to select between an installment payment (e.g., a monthly payment option) and a paid-in-full payment.

The horizontal scroll bar 1402 may be moved through keyboard selections and/or relative and/or absolute pointing device movements. A selection allows users to scroll through different coverages and price points. The scroll bar 1402 may have two or more (e.g., multiple) active areas: two scroll arrows positioned at proximal and distal ends for moving incrementally between the closest coverage prices at an increasing or decreasing premium, a sliding scroll box for moving to an arbitrary coverage or price point between an upper and lower premium limit (that may be designated near the proximal and distal ends of the arrows), and (in some processes/systems) an intermediate area between the proximal and distal ends for scrolling through quotes in increments in real time. Content movement through more coverage and higher costs quotes may occur when a user selects a portion of the scroll bar between an upper premium limit and the sliding scroll box, while movement through lower coverage and lower costs quotes may occur when a user selects a portion of the scroll bar between a lower premium limit and the sliding scroll box.

Figure 16:
Figure 17:
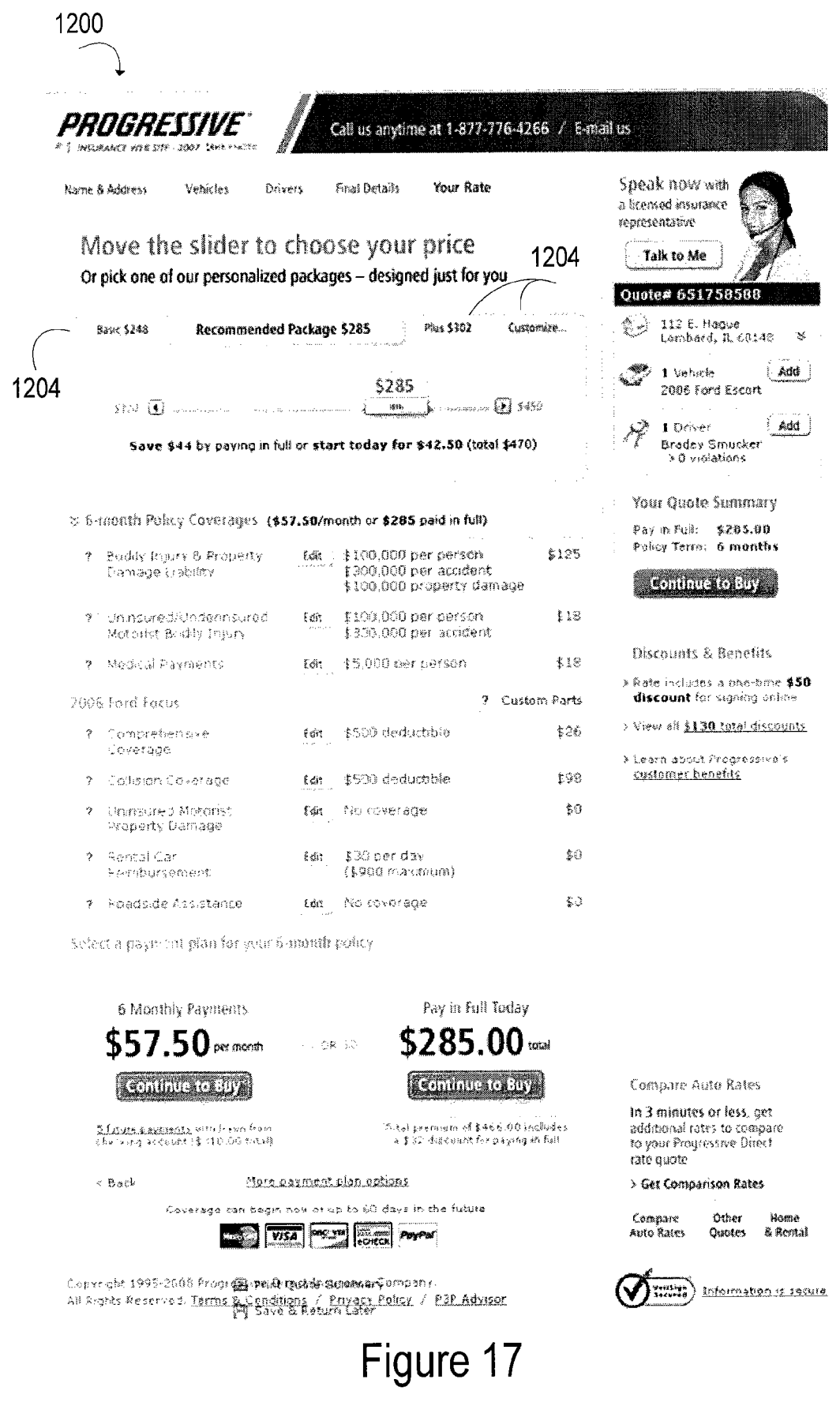
Figure 19:

When coverages are selected through interactive toggle button(s) 1204, submissions of desired prices, and/or through scroll bar movement, the line coverages of the policy may be rendered or may change in the line coverage area 1208 of the page. As the coverages change, the appearances may be highlighted. Line coverages may be further customized to a user's needs or preferences through menu programs 1602, such as on-screen edit features, that may be adjacent to a line coverage as shown in FIG. 16. After activating this feature by clicking, selecting, or hovering a cursor over an edit button, a drop-down menu may appear. The menu may highlight available options that are available in the context in which the option is called. A change in coverage, may be made through a keyboard entry or pointing device. Some menus items, balloons, or dialog boxes may provide additional information, advice, and pricing for a desired change as shown in FIGS. 17-20. The price may represent differences between a selection and a current cost of the quoted policy.

In some alternative pages, each or selected line coverages included in a quote may be modified through horizontal scroll bars that may be moved through keyboard and/or relative or absolute pointing device movements. A scroll bar movement allows users to scroll through different line coverages and price points. The scroll bar may have multiple active areas: two scroll arrows for moving incrementally between the closest line-item prices at an increasing or decreasing cost, a sliding scroll box for moving to an arbitrary coverage or price point between an upper and lower line-item limit (that may be designated near adjacent ends of the arrows), and (in some processes/systems) an intermediate area for scrolling through line-item coverages and costs in increments. Content movement through more coverage and higher prices coverages may occur when a user selects a portion of the scroll bar between an upper price limit and the sliding scroll box, while movement through lower coverage and lower prices may occur when a user selects a portion of the scroll bar between a lower price limit and the sliding scroll box.

In some pages, one or more of the option selection area, option selection display area, and line coverage area may be anchored to an interface that may provide access to an insurance representative (e.g., that may be accessed through an application sharing controller) and summaries of user details and quotes like the entry pages. The anchored objects may move relative to these areas of the page or may remain stationary to keep these objects in view or at a certain position in a page or document.

In some implementations, applicant's information submitted or shown through FIGS. 9-20 may be validated or checked for errors before a quote or offer of insurance is made, or after it is made through an optional validating processor or controller. When an error is found, the errors may be identified through a document or screen. In some implementations, the automated insurance quote system may dynamically generate links or hyperlinks to the pages or documents containing the errors, which allow users to access the errors in a fast and sometimes sequential order. In other implementations, programmable decision rules (resident to the client, firmware, controllers, and/or server cluster) may correct the errors by overwriting the entered or populated files of the summary to reflect the validated information that may be received from one or more outside sources, such as a server or database retaining motor vehicle records or an insurer's internal records.

When an insurance selection occurs in FIGS. 12-20, the client or process conveys the user' selections to a destination, such a server, cluster, processors or other hardware that provide specialized tasks for an insurance company. In response to the receipt of the data, another user (e.g., insurer) may post a decision in real time or after a delay on an online Web site or transmit the decision to applicant through a secure communication link during or after their online session. The decisions may include an acceptance and approval, coverage details, terms, insurer stipulations, a request for information, an offer of an alternative insurance plan, and/or a decline.

In some sessions, the user may not complete the application or quote process. In these sessions and others, applicant data may be saved automatically or at their direction. When rendered, a rate delivery page, such as those shown in FIGS. 12-20, may generate a quote page. In some sessions, quote pages may be retrieved by entering a combination of a last name, a quote number, a zip code, a birthday, an email address, and/or other identifying data. In other systems, the quote pages may be retrieved automatically through a transmission of session keys or actuating a hyperlink.

Users may compare coverages and rates too. Once a rate is customized, a hyperlink on the rate pages of FIG. 12-20 may initiate a comparison to quotes offered by other insurers. In some implementations, the customized and/or competitor quotes may be normalized by the server or server cluster to ensure a consistent comparison (e.g., a statistical normalization that may render similar coverage, terms, etc.). A client-side, server side script, firmware, embedded controller, and/or flash application, for example, may render a comparison table that allows a user to compare coverages and rates and elect coverages.

When users elect to make insurance decisions such as purchasing insurance, an automated program and/or firmware processes the content. The process may link the user to a buy flow that may qualify the user. A qualification processor in communication with the front-end processor and/or quote processor may process Claim Loss Underwriter Information (CLUE) data, credit reports, DMV data, MV data, and other/ information to qualify a user. Because qualification processes may vary with insurance providers, any qualification algorithm may be executed by the qualification processor. In some systems, a user's qualification may adjust a quote or suggested coverage. In those systems, the automated insurance quote systems allow user's to customize their coverage, term, and/or price that reflect the qualifications of the user. In a buy flow, users may customize coverage, term, and/or seek system generated recommendations as described. Users may be offered a second chance to customize their coverage, price, term, or other insurance parameter once the user is qualified. When complete, the process may electronically coordinate, electronically generate, and/or transmit or convey documents needed to execute, close, or deny the insurance.

Alternative automated insurance systems may qualify or adjust offered coverages based on the user's actual driving behavior. User's actual driving behavior may be monitored through the systems and methods of U.S. patent application Ser. No. 10/764,076 entitled "Monitoring System for Determining and Communicating a Cost of Insurance" U.S. patent application Ser. No. 12/132,487, entitled "Vehicle Monitoring System" which are incorporated by reference. In these systems, input/output processor of the automated insurance quote system may receive the data and through comparisons with predetermined driver profiles (retained in the data warehouses or databases) potential coverage may be rendered. The coverage may be customized through interactive objects such as those described above.

Figure 22:
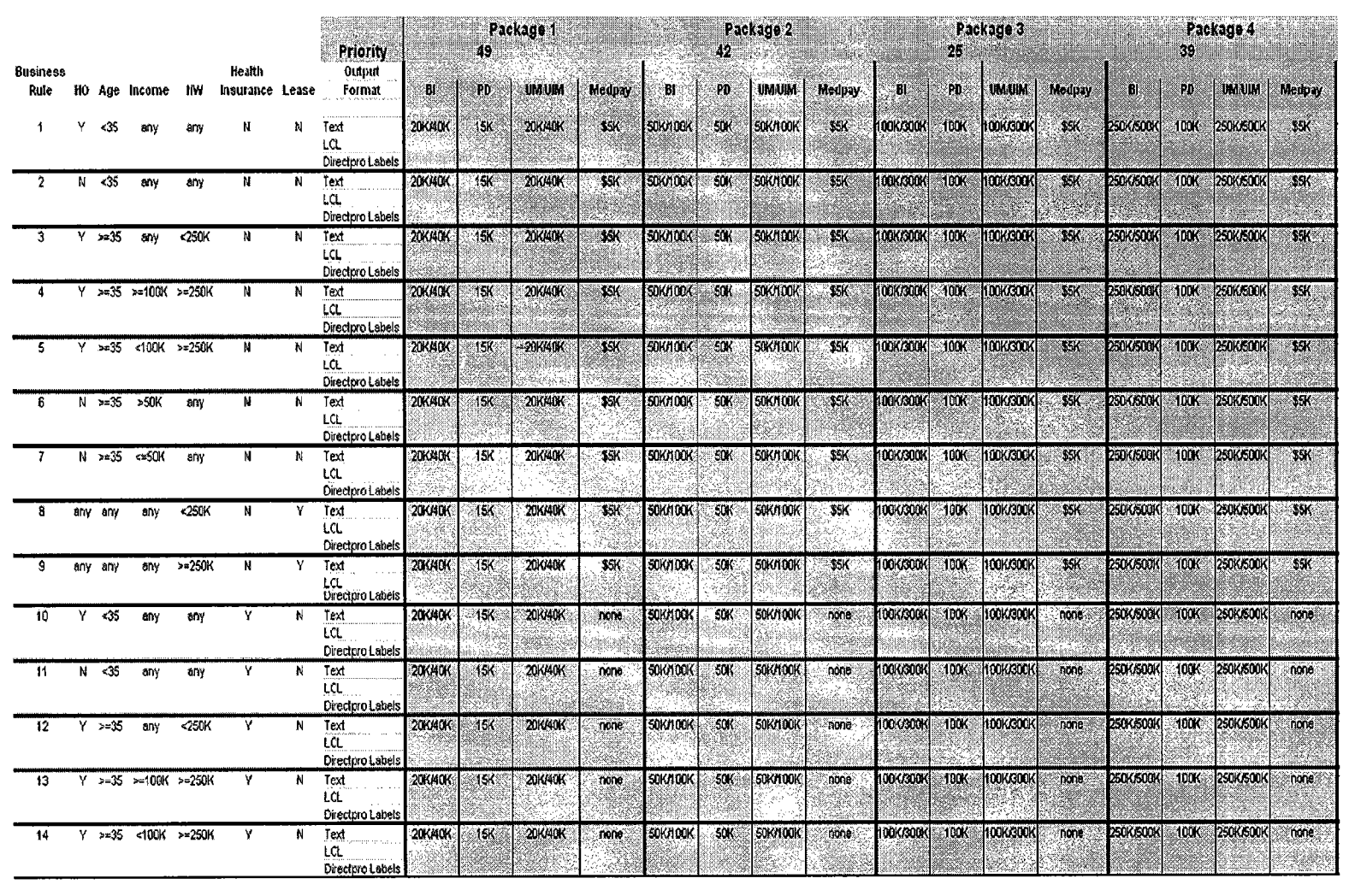

FIGS. 21-22 are exemplary tables of liability business rules that may be retained in memory, a database, or data warehouse that may be accessed by the automated insurance quote system. A liability insurance quote may assume the risk of financial loss arising from liability for bodily injury or property damage to third parties caused by vehicle accidents. In some systems, the rules maintain a mutual exclusion that ensures applicants qualify under only one liability insurance rule. Applicants may be differentiated through a combination of attributes, such as homeownership, age, income, net worth, vehicle ownership, lease, or other liability attributes. Based on an applicant's qualification, coverage limits may be defined for one or more coverages that may include bodily injury, property damage, uninsured motorist, underinsured motorist, and/or medical payments that are in compliance with local or state regulations.

FIGS. 23-24 are exemplary tables of vehicle business rules that may be retained in a memory, a database or data warehouse that may be accessed by a slave-processor or other devices that receive or process input from the automated insurance quote system. Like the exemplary liability business rules, applicants may qualify under one vehicle business rule. Differentiation may occur through one or more attributes, such as vehicle ownership, vehicle age, primary applicant age, collision coverage, or other vehicle attributes. Based on an applicant's qualification, coverage limits may be defined for one or more coverages that may include collision, comprehensive coverage, underinsured motorist, property damage, rental reimbursement, roadside assistance, and an aggregate payoff.

FIG. 25 shows an exemplary link between the business rules and coverages that may be accessed from a database or data warehouse. In this exemplary implementation, a user may customize accidental bodily injury, comprehensive, rental reimbursement, and roadside claim assistance. Based on these customizations, coverage may be selected by the client, quote processor, server, or server cluster that coincides with a package associated with the liability business rule and a vehicle business rule. Based on actuarial data associated with coverages and rates filed with a department of insurance (or its equivalent) in a state, variable price ranges may be derived and offered to applicants.

Alternative automated insurance quote systems may be implemented with any combination of structures and/or functions described above or shown in FIGS. 1-21. For example, when a user locks in a coverage and/or price point, a quote processor or the recommendation engine may generate recommendations that have the same or similar coverage a user selected or locked-in. While many algorithms may be used; some automated insurance quote systems make recommendations based on a quote's popularity (e.g., may be measured by the acceptance rate or usage rate, for example) and/or a user's demographics. Other factors may include (additionally or alternatively), for example, the number of times a coverage or price point has been selected in a predetermined time period (during a week, month, multiple months, year(s) etc.), and/or other quantitative measures that may be retained in a local or remote recommendation database. In some alternate systems, a recommendation may include secondary indicia that reflects the popularity of a recommendation. The secondary indicia may be filtered to reflect the popularity of the recommendation with others that are similarity situated.

Other alternative automated insurance systems are formed from any combination of structure and functions described above or illustrated within the figures. The systems and processes are not limited to new or perspective policyholders. Alternate systems serve existing customers through an agent and/or self-service channel through each of the embodiments described above. Each of the systems may allow for adjustments at a renewal event or during the term of a policy. Besides the descriptions above, the online pages may be rendered through alternative software or hardware. The alternative hardware may include a processor or a controller in communication with a volatile and/or non-volatile memory that retains firmware (described above) and interfaces peripheral devices through a wireless or a tangible medium. Alternative visual displays may also be rendered by the input/ output processor. Some automated insurance quote systems may graphically display thirty or more (or an unlimited number) of insurance quotes and/or policies through an image carousel. The input/output processor may display user selected images of multiple customized insurance quotes and/ or policies in a three dimensional proportionality that may be fanned across a screen. In some systems the display parameters may also be customizable to allow users to control page size, rotation rates, and other parameters that render a user friendly display.

In some other alternative automated insurance quote systems, users may customize a limited number of parameters. For example, some systems allow users to vary only deductible or coverage amounts. By varying these parameters the system may generate a customized price. In other alternative automated insurance quote systems users may vary a policy term to meet a desired price or coverage level. In these systems, any subset of the variable insurance parameters or attributes may be adjusted. These systems and each of the systems and methods described above may evaluate the cost and effect of changing certain policy parameters such as replacing a vehicle, adding a driver, etc. Such changes may be valuated and rendered by interfacing the systems and methods of U.S. Pat. No. 7,124,088 entitled "Apparatus for Internet On-line Insurance Policy Service," which is incorporated by reference.

The automated insurance quote system may streamline the insurance process by coordinating all of the activities associated with providing insurance. As used in the description and throughout the claims a singular reference to an element (e.g., a policy, a coverage, a processor, etc.) further includes and encompasses plural references unless the context clearly dictates otherwise. The systems may enhance the collection of information related to one or more insurance quotes or polices by gathering information in real-time, near real-time, or after a delay at a physical or a virtual site. The system may leverage data by offering insurance quotes, policies, and/or protection plans that are allowed under the law and are tailored to user data or to a user's needs or preferences. The system may allow a user to select or enter details of vehicles and drivers, and in some alternative systems, the effective dates of an insurance policy and/or a customized renewal term.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system comprising a processor and a memory accessible to the processor and an interface comprising:
 a logic stored in the memory and executable by the processor for rendering a specific user interface within a display area comprising a plurality of active areas for moving between different insurance coverages and price points of a plurality of customizable insurance quotes, the active areas comprising a proximal end and a distal end for moving incrementally between the customizable line coverage types and price points, a sliding scroll box for moving to an arbitrary customizable line coverage type and price point, and a plurality of intermediate areas between the sliding scroll box and the proximal end and the distal end for moving incrementally between the customizable line coverages and price points; and
 a database that stores customized data indicating the selections made by the user and parameters made by the system that are in compliance with the user's designated state laws, where the customized data identifies selected insurance coverage, and corresponding maximum coverage limits.

2. The system of claim 1 where the database additionally retains personal data records through which each user may view, add, or modify based on a user's access restrictions.

3. The system of claim 1 where a second logic stored in the memory and executable by the processor that renders a second interface that recommends an insurance coverage in compliance with the user's designated state laws and further renders functionality for the user to select insurance coverage based on the quote information and access a plurality of customizable line coverage types, where the second logic is executable to transmit data and receive data from an insurance site through a publicly accessible distributed network.

4. The system of claim 3 where the second logic renders an insurance coverage in compliance with the user's designated state laws and a lending source that has an encumbrance on an insured object and where the user comprises an applicant or quoter.

5. The system of claim 3 where the customizable line coverage types are positioned in a sequence that reflects a user's aversion to risk detected from the quote information provided by the user.

6. The system of claim 1 further comprising a second logic stored in a memory and executable by the processor that renders a second user interface that represents programs, files, and option selections through menus and dialog boxes that receives a user's quote information through a publicly accessible distributed network.

7. The system of claim 1 further comprising a second logic stored in the memory and executable by the processor for rendering a second user interface having functionality to render a plurality of payment plans, where a selection of a payment plan identifies a user's elected insurance coverages and further renders functionality for users to complete an insurance transaction and make an on-line payment.

8. The system of claim 1 further comprising a second logic stored in the memory and executable by the processor for rendering a graphical device interface having functionality that renders images and other graphical elements adjacent to personal information contained in user's quote information and data accessed from a remote source, where the images, other graphical elements, and personal information are associated with a quote identifier retained in the database.

9. The system of claim 1 where the processor comprises a fat client that executes substantially all of the processing of the system.

10. The system of claim 1 where the processor comprises a fat server that executes substantially all of the processing of the system.

11. The system of claim 1 where the logic is executable by the processor for rendering a line coverage area in the specific user interface that displays line coverages of an insurance quote, and where the logic is executable by the processor to change one or more of the line coverages in the line coverage area of the specific user interface in response to movement of the sliding scroll box from one position to another.

12. The system of claim 11 where the logic is executable by the processor for highlighting an appearance of the one or more line coverages that were changed in the line coverage area of the specific user interface in response to the movement of the sliding scroll box.

13. In a network based system that provides functionality for users to enter into an insurance transaction, a computer implemented method for users to customize insurance coverages that are in compliance with their local and applicable laws, comprising:
 receiving a user's quote information through a publicly accessible distributed network in communication with a first user interface that comprises programs and option selections through menus and dialog boxes;
 receiving a user's selection of a recommend insurance in compliance with the user's designated applicable laws based on the user's quote information, where the user's selection reflect a plurality of customizable insurance line coverage types that are rendered through an insurance site and the publicly accessible distributed network;
 generating a display comprising a plurality of active areas for moving between different insurance coverage types and price points of a plurality of customizable insurance quotes, the active areas comprising a proximal position and a distal position for the user to move incrementally between the customizable line coverage types and price points, a sliding scroll box for the user to move between arbitrary customizable line coverage types and price points, and a plurality of intermediate areas between the sliding scroll box and the proximal position and the distal position for the user to move incrementally between the customizable line coverage types and price points; and accessing a database through a slave processor that stores customized data reflecting the selections made by the user that are in compliance with the user's designated applicable laws, where the customized data identifies the insurance coverage type, maximum coverage limits, and a cost.

14. The method of claim 13 where the database additionally retains personal data records through which each user may view, supplement, or modify based on a user's access restrictions.

15. The method of claim 13 further comprising ensuring that the system receives only a user's selection of recommend insurance in compliance with the user's designated applicable laws.

16. The method of claim 13 further comprising ensuring that the system only recommends an insurance coverage in compliance with the user's designated applicable laws and a lending source having an encumbrance on an insured object.

17. The method of claim 13 where the system displays customizable line coverage types in a sequence that reflects a user's aversion to risk detected from the quote information received from the user.

18. The method of claim 13 further comprising providing a second user interface having functionality for users to send and receive messages through the publicly accessible distributed network while maintaining access to the first user interface.

19. The method of claim 13 further comprising a second user interface having functionality to render a plurality of payment plans, where a selection of a payment plan identifies a user's elected insurance coverages and further renders functionality for users to complete an insurance transaction and make an on-line payment.

20. The method of claim 19 further comprising a rendering a graphical device interface having functionality to render or display images and other graphical elements adjacent to personal user information contained in the user's quote information and data accessed from a remote source, where the images, other graphical elements, and personal user information are associated with a quote identifier retained in the database.

21. The method of claim 13 where the system comprises a fat client that executes substantially all of the processing of the method.

22. The method of claim 13 where the processor comprises a fat server that executes substantially all of the processing of the method.

23. A customizable insurance system, comprising:
a processor;
a memory accessible to the processor;
logic stored in the memory and executable by the processor for rendering a user interface within a display area, where the user interface comprises an active area that allows a user to move between different insurance coverages and price points of an insurance quote, where the active area comprises a proximal end associated with a first price point and a first package of insurance coverage line items, a distal end associated with a second price point and a second package of insurance coverage line items, one or more intermediate areas between the proximal end and the distal end that are associated with one or more intermediate price points and one or more intermediate packages of insurance coverage line items, and a sliding scroll box movable between the first price point, the second price point, and the one or more intermediate price points in response to a user movement of the sliding scroll box within the user interface for selection of an insurance package; and
a database that stores customized insurance data indicating a price point and insurance package selection made by the user based on a position of the sliding scroll box.

24. The system of claim 23, where the user interface also comprises a line coverage area, where the processor is configured to render the first package of insurance coverage line items in the line coverage area when the sliding scroll box is positioned at the distal end, where the processor is configured to render the second package of insurance coverage line items in the line coverage area when the sliding scroll box is positioned at the proximal end, and where the processor is configured to render one of the intermediate packages of insurance coverage line items in the line coverage area when the sliding scroll box is positioned in one of the intermediate areas.

25. The system of claim 24, where the processor is configured to highlight an appearance of one or more insurance coverage line items that changed in the line coverage area of the user interface in response to a movement of the sliding scroll box.

* * * * *